(12) United States Patent
Aoki et al.

(10) Patent No.: US 10,302,984 B2
(45) Date of Patent: *May 28, 2019

(54) LIQUID CRYSTAL DISPLAY DEVICE WITH TOUCH PANEL

(71) Applicant: Japan Display Inc., Tokyo (JP)

(72) Inventors: Yoshinori Aoki, Mobara (JP); Keita Sasanuma, Mobara (JP); Kazune Matsumura, Mobara (JP)

(73) Assignee: Japan Display Inc., Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 15/691,883

(22) Filed: Aug. 31, 2017

(65) Prior Publication Data

US 2018/0039119 A1    Feb. 8, 2018

Related U.S. Application Data

(63) Continuation of application No. 14/744,804, filed on Jun. 19, 2015, now Pat. No. 9,778,501, which is a (Continued)

(30) Foreign Application Priority Data

Jan. 24, 2012   (JP) .................. 2012-012262

(51) Int. Cl.
*G02F 1/1343* (2006.01)
*G02F 1/1333* (2006.01)
(Continued)

(52) U.S. Cl.
CPC .... *G02F 1/13338* (2013.01); *G02F 1/134336* (2013.01); *G06F 3/044* (2013.01);
(Continued)

(58) Field of Classification Search
CPC ............... G02F 1/13338; G02F 1/1345; G02F 2001/134318; G06F 3/041; G09G 3/3618; G09G 3/3655
(Continued)

(56) References Cited

U.S. PATENT DOCUMENTS

2004/0217945 A1   11/2004  Miyamoto et al.
2008/0198140 A1    8/2008  Kinoshita et al.
(Continued)

FOREIGN PATENT DOCUMENTS

JP    2007-241358 A    9/2007
JP    2009-258182 A   11/2009
(Continued)

OTHER PUBLICATIONS

Office Action dated Dec. 25, 2013 regarding a counterpart Korean patent application No. 10-2013-7525.
(Continued)

*Primary Examiner* — Paisley L Arendt
(74) *Attorney, Agent, or Firm* — Typha IP LLC

(57) ABSTRACT

A second substrate has detection electrodes of a touch panel, each of pixels has a pixel electrode and a counter electrode, the counter electrode is divided into a plurality of blocks, the counter electrodes of the respective divided blocks are commonly provided for the respective pixels of the plurality of display liner in series, and the counter electrodes also serve as scanning electrodes of the touch panel, and a counter electrode selector circuit that selects the counter electrodes. The counter electrode selector circuit includes an address decoder circuit that selects the counter electrodes of the respective blocks for a given period, and a selector circuit that applies a touch panel scanning voltage to the counter electrode of the block selected by the address decoder circuit, and applies a counter voltage to the counter
(Continued)

electrodes of the blocks not selected by the address decoder circuit.

12 Claims, 23 Drawing Sheets

Related U.S. Application Data continuation of application No. 13/746,350, filed on Jan. 22, 2013, now Pat. No. 9,104,055.

(51) Int. Cl.
| | | |
|---|---|---|
| *G06F 3/041* | (2006.01) | |
| *G06F 3/044* | (2006.01) | |
| *G09G 3/36* | (2006.01) | |
| *G02F 1/1362* | (2006.01) | |

(52) U.S. Cl.
CPC ......... *G06F 3/0412* (2013.01); *G09G 3/3655* (2013.01); *G02F 1/134363* (2013.01); *G02F 1/136286* (2013.01); *G06F 2203/04111* (2013.01); *G09G 3/3618* (2013.01); *G09G 2300/023* (2013.01); *G09G 2300/0426* (2013.01); *G09G 2300/0465* (2013.01)

(58) Field of Classification Search
USPC .......................................... 349/12
See application file for complete search history.

(56) References Cited

U.S. PATENT DOCUMENTS

| | | | |
|---|---|---|---|
| 2009/0256818 A1 | 10/2009 | Noguchi et al. | |
| 2010/0182273 A1 | 7/2010 | Noguchi et al. | |
| 2012/0081320 A1* | 4/2012 | Hwang | G06F 3/0418 345/173 |
| 2012/0105337 A1* | 5/2012 | Jun | G06F 3/0412 345/173 |

FOREIGN PATENT DOCUMENTS

| | | |
|---|---|---|
| JP | 2011-008706 A | 1/2011 |
| JP | 2011-013288 A | 1/2011 |
| KR | 10-2010-0127164 A | 12/2010 |

OTHER PUBLICATIONS

Office Action dated Aug. 18, 2015 regarding Japanese Patent application No. 2012-012262.

\* cited by examiner

LIQUID CRYSTAL DISPLAY DEVICE WITH TOUCH PANEL

CROSS REFERENCE TO RELATED APPLICATIONS

This application is a continuation of U.S. patent application Ser. No. 14/744,804, filed on Jun. 19, 2015, which, in turn, is a continuation of U.S. patent application Ser. No. 13/746,350, (now U.S. Pat. No. 9,104,055) filed on Jan. 22, 2013, which claims priority from Japanese Patent Application No. JP2012-012262 filed on Jan. 24, 2012, the contents of which are hereby incorporated by reference into this application.

BACKGROUND OF THE INVENTION

1. Field of the Invention

The present invention relates to a liquid crystal display device, and more particularly to a technique effectively applied to a liquid crystal display device with built-in a touch panel so called in-cell type.

2. Description of the Related Art

A display device having a device (hereinafter referred to also as "touch sensor" "touch panel") for entering information by the operation of touching (touch pressing operation, hereinafter referred to merely as "touch") a display screen with a user's finger, pen or the like is used for mobile electronic devices such as a PDA or a portable terminal, a variety of home electric appliances, and automated teller machines and so on.

As the touch panel of this type, there has been known a capacitance type that detects a change in a capacitance of a touched portion.

As the touch panel of the capacitance type, a liquid crystal display device having the so-called in-cell type touch panel, which is a liquid crystal display panel with a built-in touch panel function, has been known as disclosed in JP 2009-258182 A.

In the touch panel of the in-cell type, scanning electrodes of a tough panel are configured by dividing a counter electrode (also called "common electrode") formed on a first substrate (so-called "TFT substrate") configuring the liquid crystal display panel.

SUMMARY OF THE INVENTION

In the touch panel of the in-cell type, when a counter voltage (also called "common voltage") to be applied to the counter electrode fluctuates due to a parasitic capacitance in the display operation, because an image quality is deteriorated, there is a need to decrease a wiring resistance between each of the divided counter electrodes and a driver IC.

Wirings between the driver IC and the divided counter electrodes are arranged on right and left sides of a display area of the liquid crystal display panel. Therefore, widths of right and left frames of the liquid crystal display panel are increased in proportion to an increase in the number of wirings.

On the other hand, in the touch panel of the capacitance type, because a change in the capacitance due to the finger touch or the like is detected, it is desirable that a width of the scanning electrodes that conduct AC driving is about 4 to 5 mm. For that reason, the display panel such as the liquid crystal display panel is upsized, resulting in an increase in the number of scanning electrodes. For example, in the liquid crystal display panel of 3.2 inches having a resolution of FWVGA (480 RGB×854), because a vertical length thereof is about 71 mm, there is a need to divide the vertical length into 14 sections for the purpose of obtaining pitches of about 5 mm. Also, in the liquid crystal display panel of 4.5 inches having a resolution of HD (720 RGB×1280), because the vertical length is about 95 mm, there is a need to divide the vertical length into 20 sections.

Thus, when the size of the liquid crystal display panel is increased from 3.2 inches having the resolution of FWVGA (480 RGB×854) to 4.5 inches having the resolution of HD (720 RGB×1280), each width of the right and left frames is increased by a total wiring width of six wirings.

The present invention has been made to solve the problems with the related art, and an object of the present invention is to provide a technique in which a frame area can be reduced more than that in the related art even if a size of the liquid crystal display panel is upsized, in a liquid crystal display device having a touch panel function.

The above and other objects and novel features of the present invention will become apparent from the description of the present specification, and the attached drawings.

Typical outlines of the invention disclosed in the present application be described in brief below.

(1) There is provided a liquid crystal display device including a liquid crystal display panel having a first substrate, a second substrate, and liquid crystal sandwiched between the first substrate and the second substrate, and having a plurality of pixels arranged in a matrix, in which the second substrate has detection electrodes of a touch panel, each of the pixels has a pixel electrode and a counter electrode, the counter electrode is divided into a plurality of blocks, the counter electrodes of the respective divided blocks are commonly provided for the respective pixels of the plurality of display lines in series, and the counter electrodes of the respective divided blocks also serve as scanning electrodes of the touch panel, and a counter electrode selector circuit that selects the counter electrodes of the respective divided blocks is provided.

(2) In the item (1), the counter electrode selector circuit selects the counter electrodes of the two adjacent blocks at the same time.

(3) In the item (1), each of counter electrodes is commonly provided for the respective pixels of one display line on the first substrate, and the respective counter electrodes of the plurality of display lines in series are electrically connected to each other on the first substrate, and divided on a block basis.

(4) In the item (1), the counter electrode selector circuit includes: an address decoder circuit that selects the counter electrodes of the respective blocks for a given period; and a selector circuit that applies a touch panel scanning voltage to the counter electrode of the block selected by the address decoder circuit, and applies a counter voltage to the counter electrodes of the blocks not selected by the address decoder circuit.

(5) In the item (4), the counter electrode selector circuit is formed on the first substrate, and incorporated into the liquid crystal display panel.

(6) In the item (5), the first substrate includes a plurality of scanning lines that input a scanning voltage to the respective pixels, and a scanning line driver circuit that applies the scanning voltage to the plurality of scanning lines, and the plurality of pixels arranged in the matrix configure a display area, and the selector circuit of the counter electrode selector circuit is arranged between the scanning line driver circuit and the display area.

(7) In the item (5), the first substrate includes a plurality of scanning lines that input a scanning voltage to the respective pixels, and a scanning line driver circuit that applies the scanning voltage to the plurality of scanning lines, the plurality of pixels arranged in the matrix configure a display area, and the counter electrode selector circuit is arranged between the scanning line driver circuit and the display area.

(8) In the item (6) or (7), the scanning line driver circuit is formed on the first substrate, and incorporated into the liquid crystal display panel.

(9) In the item (4), the first substrate includes a plurality of video lines that input a video voltage to the respective pixels, and a video line driver circuit that applies the video voltage to the plurality of video lines, and the counter electrode selector circuit is driven and controlled by the video line driver circuit.

(10) In any one of the items (1) to (9), the pixel electrodes and the counter electrodes are insulated from each other through an interlayer insulating film.

Advantages obtained by the typical outlines of the invention disclosed in the present application will be described in brief below.

According to the liquid crystal display device having the touch panel function of the present invention, the frame area can be reduced more than that in the related art even if the size of the liquid crystal display panel is increased.

DETAILED DESCRIPTION OF THE INVENTION

Hereinafter, embodiments of the present invention will be described in detail with reference to the accompanying drawings.

In all of the drawings illustrating the embodiments, parts having the same function are denoted by identical symbols, and their repetitive description will be omitted. Also, the following embodiments do not limit the scope of the present invention.

First Related Art

Figure 1:
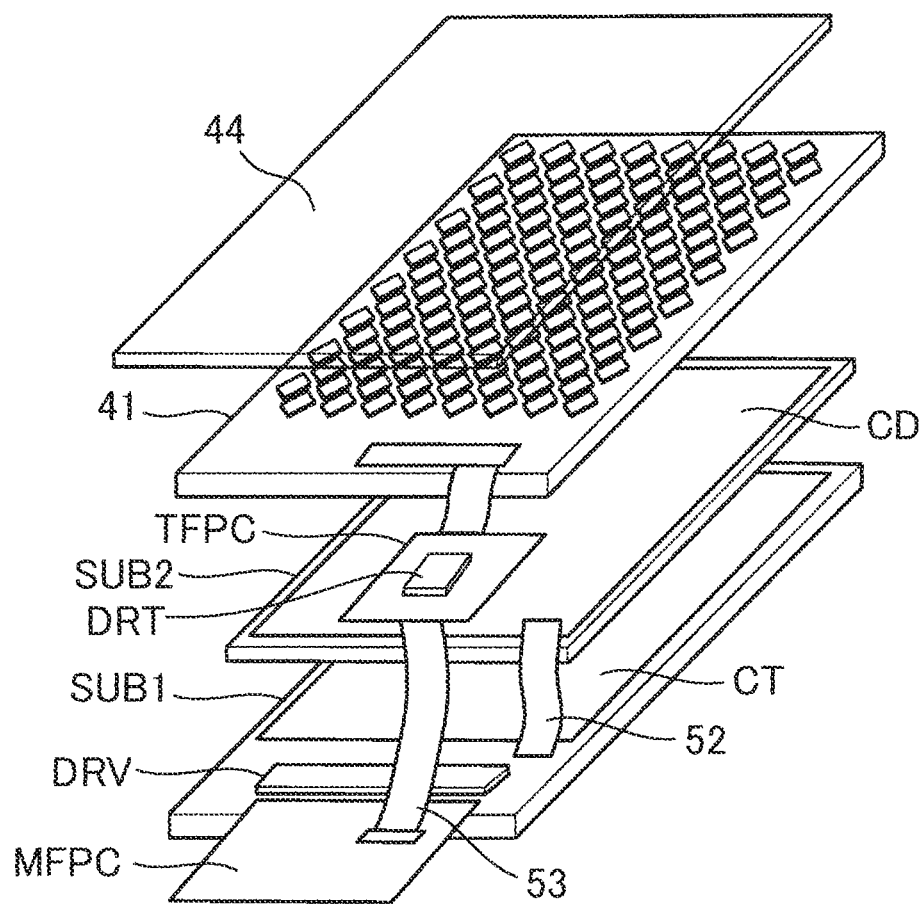
FIG. 1 is an exploded perspective view illustrating an outline configuration of a liquid crystal display device with a touch panel in a first related art.

FIG. 1 is an exploded perspective view illustrating an outline configuration of a liquid crystal display device with a touch panel in a first related art.

Figure 2:
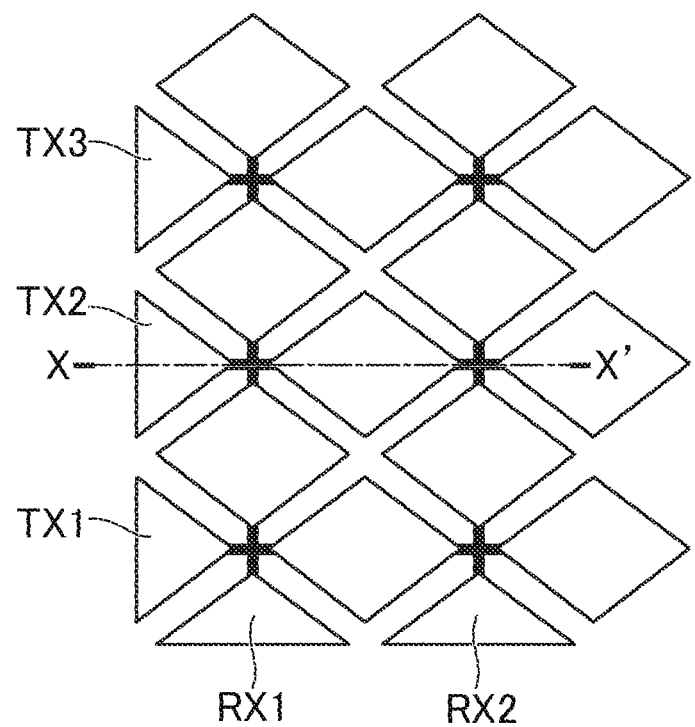
FIG. 2 is a plan view illustrating an electrode configuration of the touch panel illustrated in FIG. 1.

FIG. 2 is a plan view illustrating an electrode configuration of the touch panel illustrated in FIG. 1.

Figure 3:
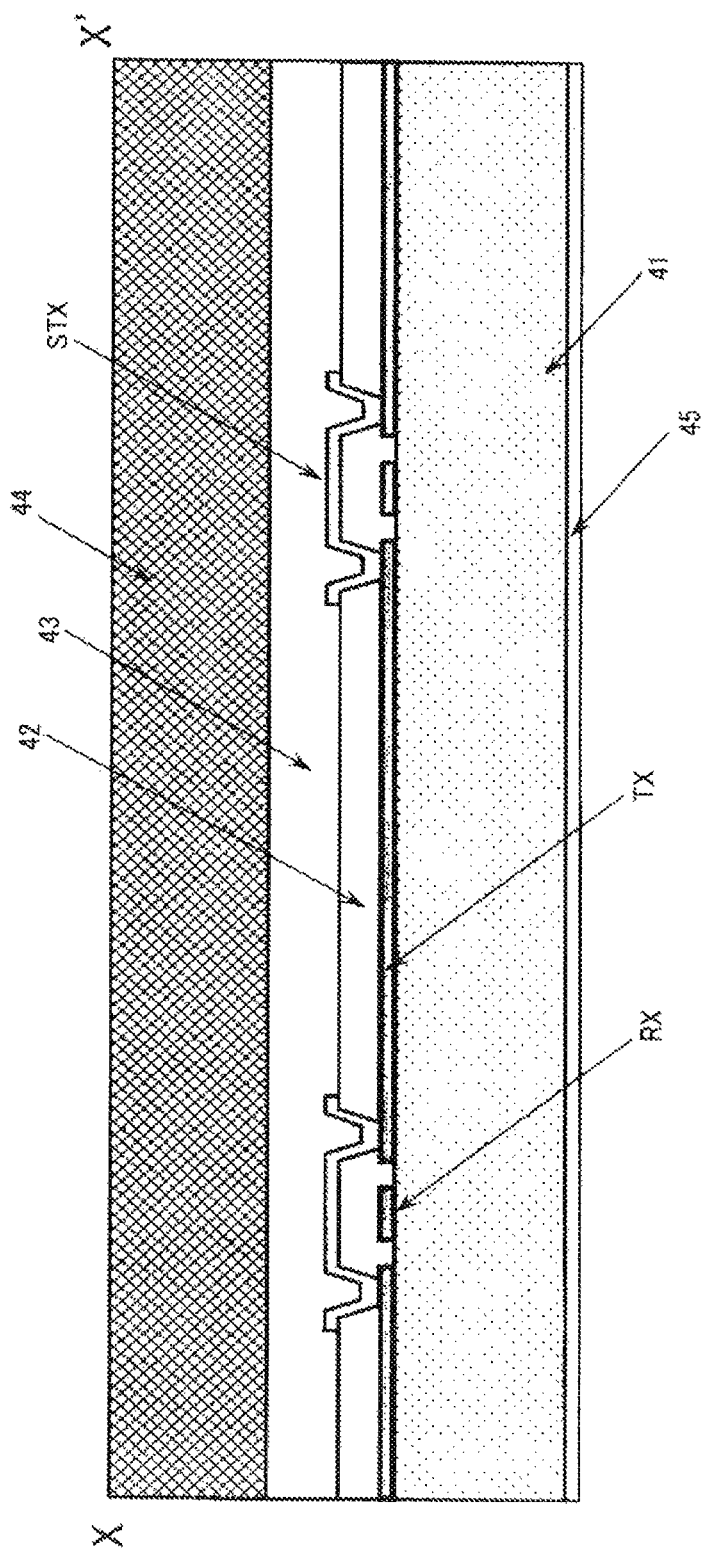
FIG. 3 cross-sectional view illustrating a cross-sectional structure of the touch panel illustrated in FIG. 1.

FIG. 3 is a cross-sectional view illustrating a cross-sectional structure of the touch panel illustrated in FIG. 1.

In general, the touch panel includes scanning electrodes (TX) for capacitance detection, and detection electrodes (RX) as illustrated in FIG. 2. In this case, for example, three (TX1 to TX3) of the scanning electrodes (TX), and two (RX1, RX2) of the detection electrodes (RX) are illustrated. However, the numbers of respective electrodes are not limited to those values.

Also, as illustrated in FIGS. 1 and 3, the touch panel includes a touch panel substrate 41, scanning electrodes (TX) and detection electrodes (RX) which are formed on the touch panel substrate 41, an interlayer insulating film 42 which is formed on the scanning electrodes (TX) and the detection electrodes (RX), and connection portions (STX) which are each formed on the interlayer insulating film 42, and electrically connect the scanning electrodes (TX) to each other. The touch panel also includes a protective film 43 that is formed on the connection portions (STX), a front window (or protective film) 44 which is arranged on the protective film 43, and a shield transparent electrode (for example, an electrode formed of an ITO (indium tin oxide) film) 45 which is formed on the liquid crystal display panel side of the touch panel substrate 41.

In the related art touch panel, the respective scanning electrodes (TX) are pulse-driven by a voltage of about 5 to 10 V by a touch panel control IC (DRT). In the touch panel control IC (DRT), a change in the voltage on the detection electrode (RX) is detected to detect a touch position. That is, a capacitance value between each scanning electrode (TX) and each detection electrode (RX) is changed due to a finger touch or the like, and a voltage fluctuation detected by the detection electrode (Rx) is changed when the scanning electrode (TX) is pulse-driven. As a result, the touch position can be detected with measurement of the voltage across the detection electrode (RX).

The touch panel is located in front of the liquid crystal display panel. Accordingly, when a user watches an image displayed on the liquid crystal display panel, because the touch panel needs to transmit the display image, it is desirable that the touch panel is high in light transmissibility.

As illustrated in FIG. 1, the liquid crystal display panel includes a first substrate (SUB1: also called "TFT substrate"), a second substrate (SUB2; also called "CF substrate"), and liquid crystal (not shown) sandwiched between the first substrate (SUB1) and the second substrate (SUB2).

Also, the first substrate (SUB1) is larger in area than the second substrate (SUB2), and a liquid crystal driver IC (DRV) is mounted in an area of the first substrate (SUB1) not facing the second substrate (SUB2). Further, a main flexible wiring substrate (MFPC) is mounted in a peripheral part of one side of that area.

Referring to FIG. 1, CT denotes a counter electrode (also called "common electrode"), TFPC is a touch panel flexible wiring substrate, CD is a rear surface transparent conductive film, 52 is a connection member, and 53 is a connection flexible wiring substrate.

In the liquid crystal display panel of the IPS type, the counter electrode (CT) is not present on the substrate where color filters are provided, as with the liquid crystal display panel of a TN type and the liquid crystal display panel of a VA type. Therefore, for example, for the reason of reducing a display noise, the rear surface transparent conductive film (CD) formed of a transparent conductive film made of, for example, ITO is formed on the substrate where the color filters are disposed.

Figure 4:
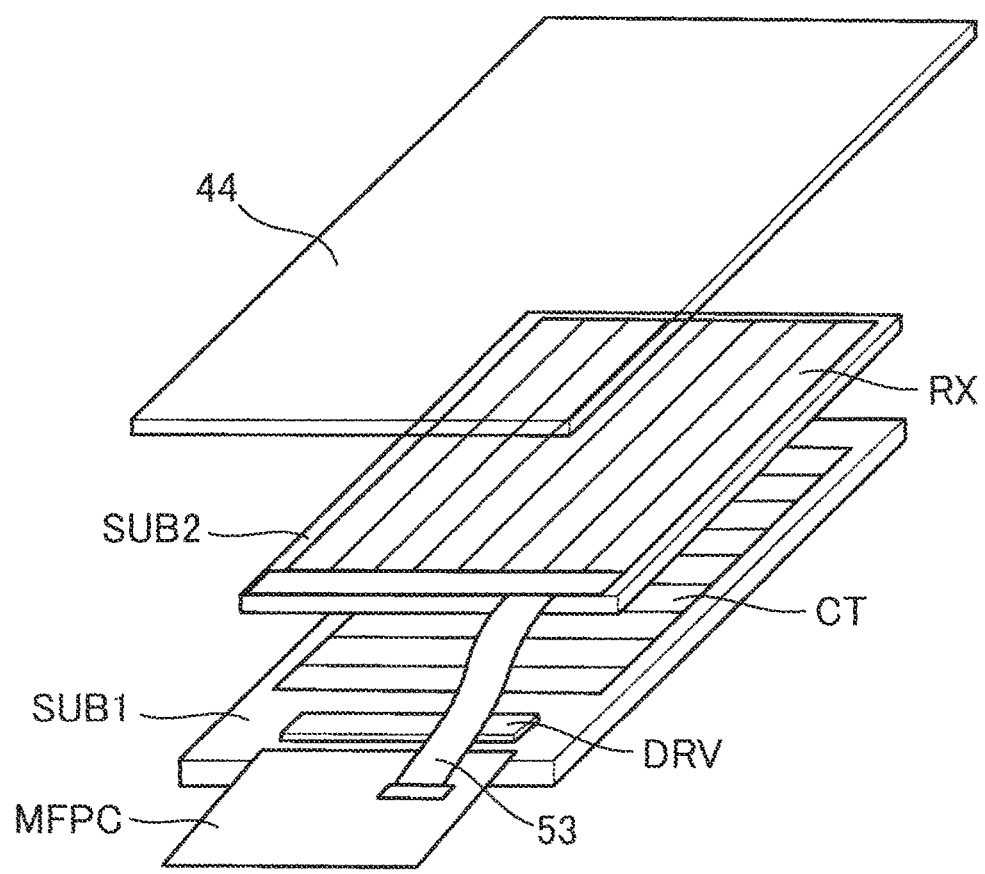
FIG. 4 is an exploded perspective view illustrating an outline configuration of the liquid crystal display device in which the touch panel of an in-cell type is incorporated into the liquid crystal display panel.

FIG. 4 is an exploded perspective view illustrating an outline configuration of the liquid crystal display device in which the touch panel of an in-cell type is incorporated into the liquid crystal display panel.

Referring to FIG. 4, SUB1 denotes the first substrate (also called "TFT substrate"), SUB2 is the second substrate (also called "CF substrate"), CT is the counter electrode (also called "common electrode"), DRV is the liquid crystal driver IC, MFPC is the main flexible wiring substrate, 44 is the front window, and 53 is the connection flexible wiring substrate.

In the liquid crystal display device illustrated in FIG. 4, the rear surface transparent conductive film (CD) on the second substrate (SUB2) is divided into band-like patterns as the detection electrodes (RX) of the touch panel. The counter electrode (CT) formed in the interior of the first substrate (SUB1) is divided into band-like patterns, that is, a plurality of blocks, and also serves as she scanning electrodes (TX) of the touch panel, to thereby eliminate the touch panel substrate (41 in FIG. 1). For that reason, in the liquid crystal display device illustrated in FIG. 4, a function of the touch panel control IC (DRT) illustrated in FIG. 1 is provided in the interior of the liquid crystal driver IC (DRV).

Figure 5:
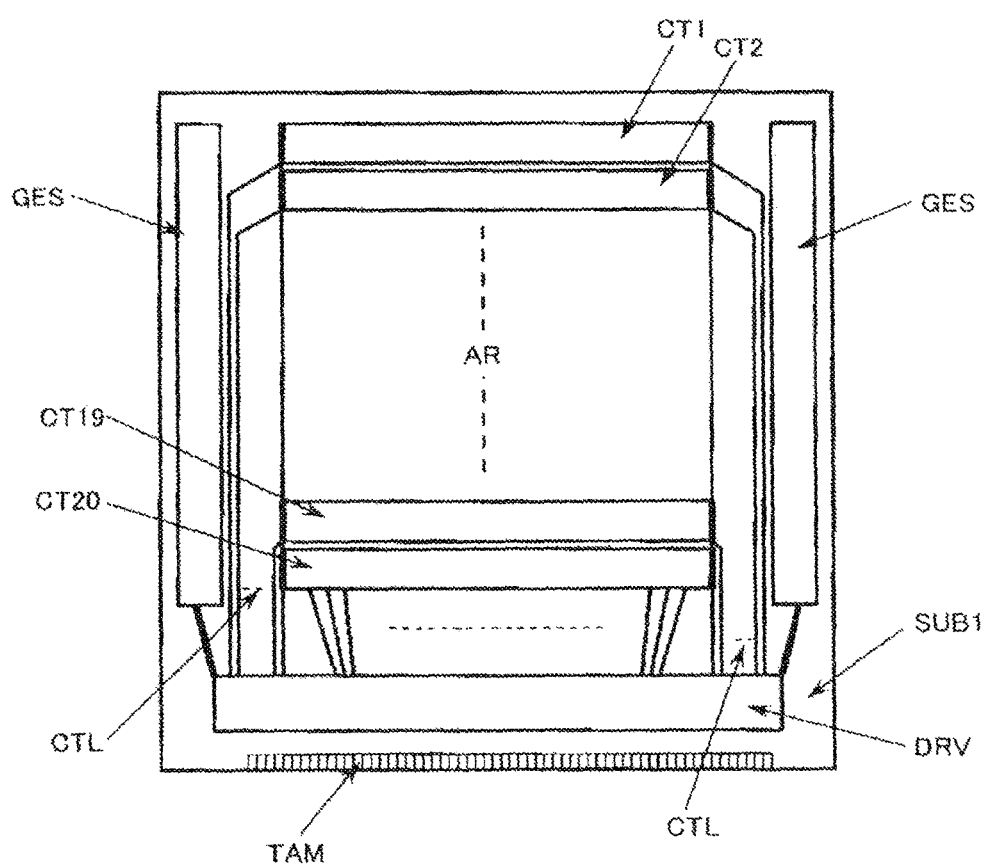
FIG. 5 is a plan view illustrating an example of a counter electrode divided into a plurality of blocks in the liquid crystal display device.

FIG. 5 is a plan view illustrating an example of a counter electrode divided into a plurality of blocks in the liquid crystal display device. Referring so FIG. 5, SUB1 is the first substrate, DRV is the liquid crystal driver IC, CT1 to CT20 are the counter electrodes of the respective blocks divided into the band-like patterns, GES are scanning line driver circuits incorporated into the liquid crystal display panel, CTL is counter electrode wirings, TAM is a terminal portion connected with the main flexible wiring substrate (MFPC), and AR is a display portion configured by a plurality of pixels which is arranged in a matrix.

In the touch panel of the capacitance type, in order to detect a change in the capacitance by the finger touch or the like, it is desirable that a width of the touch panel scanning electrodes (TX) that conduct AC driving is about 4 to 5 mm. For that reason, the number of scanning electrodes (TX) is increased with the upsized liquid crystal display panel.

In an example illustrated in FIG. 5, the counter electrode (CT) of 1280 display lines is divided into 20 blocks of CT1 to CT20 (each block is configured by the counter electrode of 64 display lines), and 20 counter electrode wirings (CTL) are required on each of the right and left sides. The counter electrodes (CT1 to CT20) of the respective blocks induce the deterioration of the image quality when the voltage fluctuates due to the parasitic capacitance in the display operation. For that reason, because there is a need to decrease a resistance value of the counter electrode wirings (CTL) that connect the counter electrodes (CT1 to CT20) of the respective blocks and the liquid crystal driver IC (DRV), when the number of divisions of the counter electrode (CT) is increased with the upsized liquid crystal display panel, a wiring area of the counter electrode wirings (CTL) is increased. As a result, the widths of the right and left frames of the liquid crystal display panel are increased.

First Embodiment

Figure 6A:
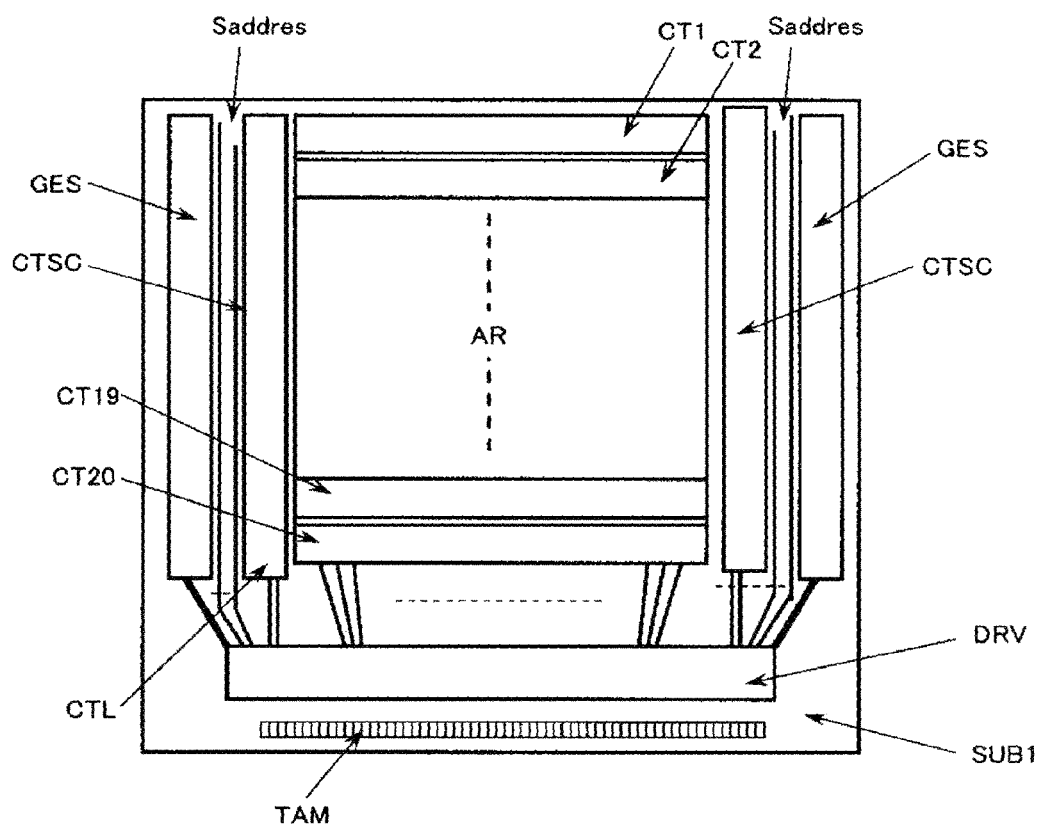
FIG. 6A is a plan view illustrating a method of driving a divided counter electrode in a liquid crystal display device according to a first embodiment of the present invention.

FIG. 6A is a plan view illustrating a method of driving a divided counter electrode in a liquid crystal display device according to a first embodiment of the present invention.

The liquid crystal display device according to this embodiment is different from the liquid crystal display device illustrated in FIG. 5 in that counter electrode selector circuits (CTSC) that select the respective counter electrodes (CT1 to CT20) divided into 20 blocks according to an address decode system are incorporated into the liquid crystal display panel.

The address decode system is applied to a method of selecting the counter electrodes (CT1 to CT20) divided into 20 blocks with the results that two wirings requiring a low resistance are provided for a counter voltage (Vcom) to be supplied to the counter electrodes (CT1 to CT20), and a touch panel scanning voltage (Vstc).

In this embodiment, the touch panel scanning voltage (Vstc) supplies a DC voltage higher than the counter voltages (Vcom) by 5 to 10V. A portion to be scanned is selected according to address signals (addres) which are supplied through address signal lines (Saddres). The counter voltage (Vcom) or the touch panel scanning voltage (Vstc) is selectively output to the counter electrode (CT) of the selected block which also serves as the scanning electrode (TX), according to a touch panel scanning signal (STC).

Even when the number of divisions of the counter electrode (CT) is increased, the increased wirings are only the address signal lines (S addres), and the number of divisions of the counter electrode used as the touch panel scanning electrodes can be increased while suppressing an increase in the width of the right and left frames of the liquid crystal display panel.

Figure 6B:
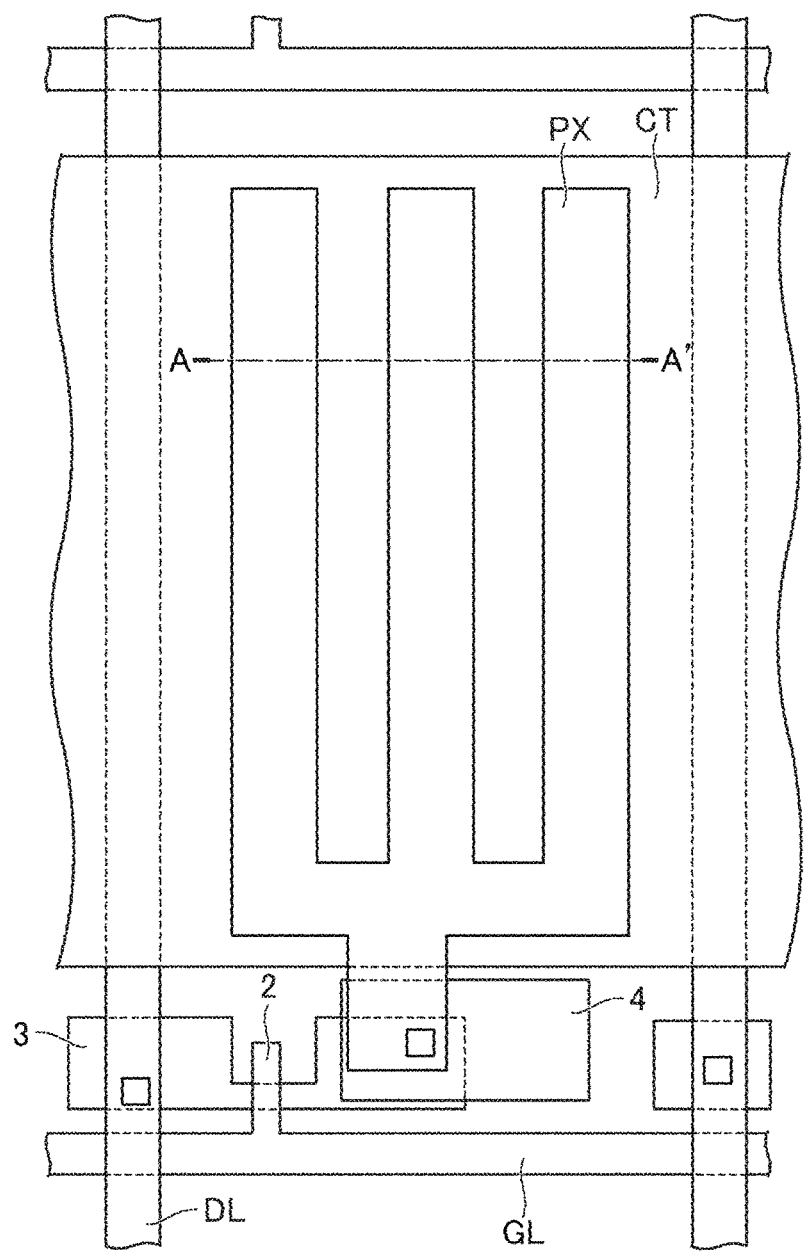
FIG. 6B is a plan view illustrating a configuration of one sub-pixel in a liquid crystal display panel according to the first embodiment of the present invention.

FIG. 6B is a plan view illustrating a configuration of one sub-pixel in the liquid crystal display panel according to the embodiment of the present invention.

Figure 6C:
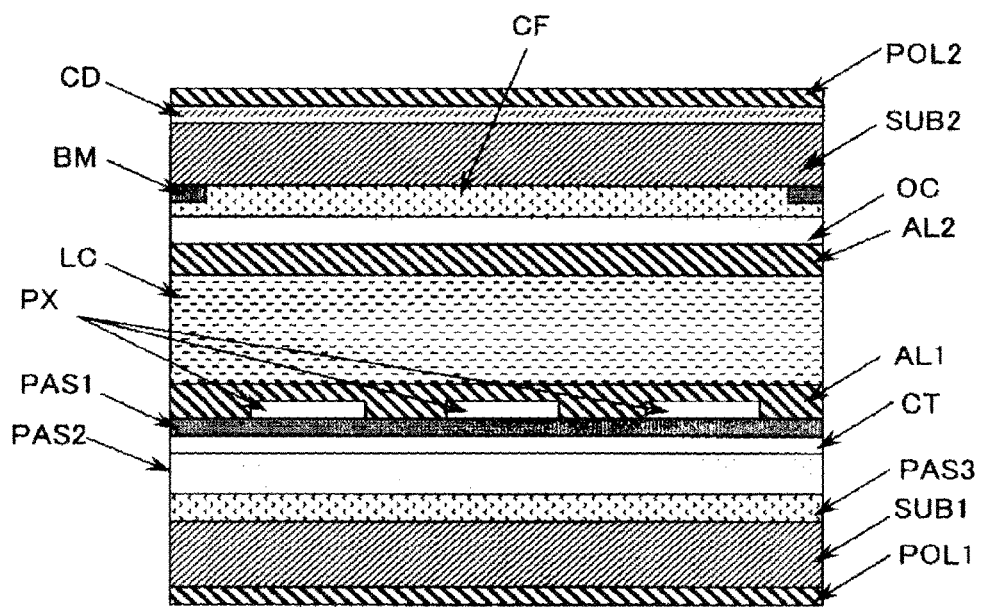
FIG. 6C a cross-sectional view illustrating a cross-sectional structure taken along a cut line A-A' illustrated in FIG. 6B.

FIG. 6C cross-sectional view illustrating a cross-sectional structure taken along a cut line A-A' illustrated in FIG. 6B. Hereinafter, a description will be given of a structure of the liquid crystal display panel according to this embodiment with reference to FIGS. 6B and 6C.

The liquid crystal display panel according to this embodiment is a liquid crystal display panel of the IPS type having planar counter electrodes, and a main surface side of the second substrate (SUB 2) is set as an observation side.

On a liquid crystal layer (LC) side of the second substrate (SUB 2) formed of a transparent substrate such as a glass substrate or a plastic substrate, a light blocking membrane (BM), a color filter layer (CF), an overcoat layer (OC), and an alignment film (AL2) are formed in the order from the second substrate (SUB 2) toward a liquid crystal layer (LC). Further, the rear surface transparent conductive film (CD) and a polarization plate (POL2) are formed outside of the second substrate (SUB 2).

Also, on the liquid crystal layer (BC) side of the first substrate (SUB 1) formed of a transparent substrate such as a glass substrate or a plastic substrate, scanning lines (also called "gate lines") (GL, not shown), a gate insulating film (PAS3), video lines (also called "drain lines" or "source lines") (DL, not shown), an interlayer insulating film (PAS2), the planar counter electrode (CT), an interlayer insulting film (PAS1), a pixel electrode (PX) formed of a pectinate electrode, and an alignment film (AL1) in the order from the first substrate (SUB 1) toward the liquid crystal layer (LC). Further, a polarization plate (POL1) is formed outside of the first substrate (SUB 1).

In the liquid crystal display panel according to this embodiment, the counter electrode (CT) is formed for each display line. Accordingly, the counter electrodes (CT1 to CT20) of the respective blocks illustrated in FIG. 6A are configured so that, for example, the respective counter electrodes (CT) of 64 display lines in series are electrically connected to each other within the liquid crystal display panel. Also, in FIG. 6B, reference numeral 2 is a gate electrode, 3 is a semiconductor layer of a thin film transistor (TFT), and 4 is a source electrode (also called "grain electrode" when the video line (DL) is called "source line").

Figure 7:
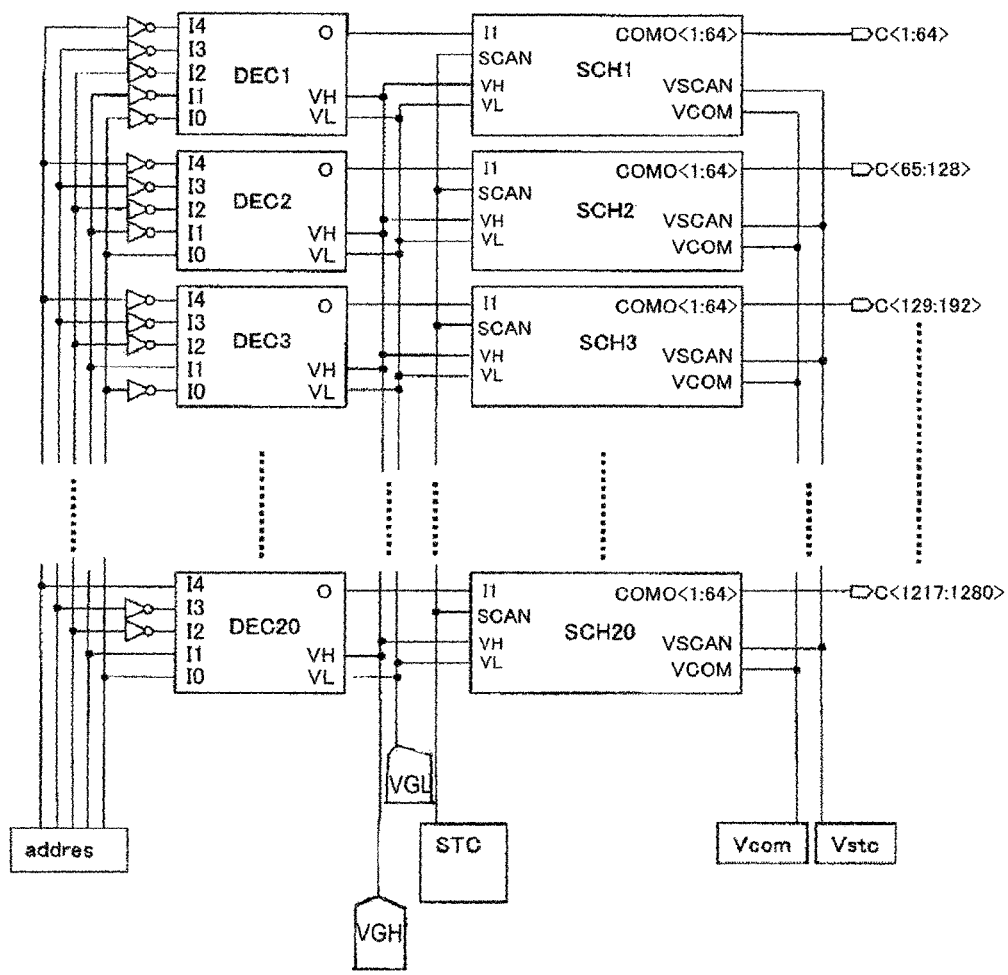
FIG. 7 is a block diagram illustrating a configuration example of a counter electrode selector circuit illustrated in FIG. 6A.

FIG. 7 is a block diagram illustrating a configuration example of the counter electrode selector circuit (CTSC) illustrated in FIG. 6A. As illustrated in FIG. 7, the counter electrode selector circuit (CTSC) includes address decoder circuits DEC1 to DEC 20, and selector circuits SCH1 to SCH 20.

In this embodiment, the counter electrodes (CT) for 64 display lines are electrically connected to each other within the liquid crystal display panel as one block so that the scanning electrodes (TX) of the touch panel are arranged at 5 mm pitches, and 1280 display lines are divided into 20 sections. The 20 divided counter electrodes (CT1 to CT20) and the address decoder circuits (DEC1 to DEC 20) are allocated to each other in a one-to-one correspondence. Because the number of divisions is 20 blocks, five address signal lines (Sadd) each having 5 bits are required.

The counter electrode of one block, that is, the counter electrode (CT) for 64 display lines, which is selected according to the address signal (addres), conducts AC driving according to the touch panel scanning signal (STC), and the other counter electrodes (CT) output the counter voltage.

Figure 8:
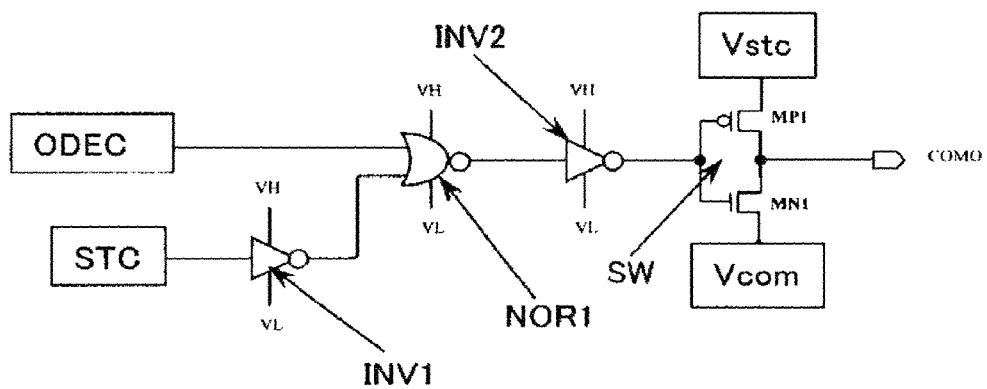
FIG. 8 is a circuit diagram illustrating a circuit configuration of an example of the selector circuit illustrated in FIG. 7.

FIG. 8 is a circuit diagram illustrating a circuit configuration of an example of the selector circuit (SCH1 to SCH20) illustrated in FIG. 7.

The selector circuit illustrated in FIG. 8 inputs an output (ODEC) of the address decoder circuits (DEC1 to DEC 20), and an inversion signal of the touch panel scanning signal (STC) inverted by an inverter (INV1) to an NOR circuit (NOR1), inverts an output of the NOR circuit (NOR1) by an inverter (INV2), and inputs the inverted signal to a switch circuit (SW). As a result, the selector circuit selects the touch panel scanning voltage (Vstc) or the counter voltage (Vcom), and outputs the selected voltage to the counter electrodes (CT1 to CT20) of the respective blocks.

With the above configuration, when one of the address decoder circuits (DEC1 to DEC 20) is selected, the selector circuit selectively outputs the touch panel scanning voltage (Vstc) and the counter voltage (Vcom) to the counter electrodes of the respective blocks according to the touch panel scanning signal (STC).

That is, in the selector circuit illustrated in FIG. 8, when the output (ODEC) of the address decoder circuits (DEC1 to DEC 20) is low level (hereinafter referred to as "L level"), and the touch panel scanning signal (STC) is high level (hereinafter referred to as "H level"), the output of the NOR circuit (NOR1) becomes H level. As a result, the switch circuit (SW) selects the touch panel scanning voltage (Vstc). When the touch panel scanning signal (STC) is L level, or the output (ODEC) of the address decoder circuits (DEC1 to DEC 20) is H level, the output of the NOR circuit (NOR1) becomes L level. As a result, the switch circuit (SW) selects the counter voltage (Vcom).

Figure 9:
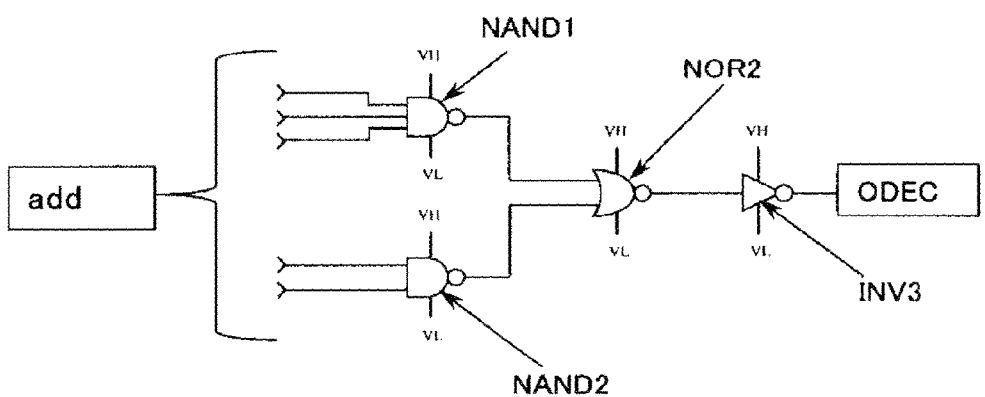
FIG. 9 is a circuit diagram illustrating a circuit configuration an example of an address decoder circuit illustrated in FIG. 7.

FIG. 9 is a circuit diagram illustrating a circuit configuration of an example of the address decoder circuits (DEC1 to DEC 20) illustrated in FIG. 7.

As illustrated in FIG. 7, the address decoder circuits (DEC1 to DEC 20) receive the address signals or the inversion signals obtained by inverting the address signals by inverters (INV) for the five address signals (addres), and conduct decoding on the basis of the combination of the five address signals (addres), and the inversion signals of the five address signals (addres).

In the address decoder circuit illustrated in FIG. 9, an address signal (add) of a given combination of the five address signals (addres) and the inversion signals of the five address signals (addres) which have been input to the address decoder circuit is input to NAND circuits (NAND1, NAND2). Outputs of the NAND circuits (NAND1, NAND2) are input to a NOR circuit (NOR2), and an output of the NOR circuit (NOR2) is inverted by an inverter (INV3) as the output (ODEC) of the address decoder circuit. Accordingly, in the address decoder circuit illustrated in FIG. 9, when the combination of the address signals matches the combination of the address signals set in the subject address decoder circuit, the voltage of L level is output as the output (ODEC) of the address decoder circuit. When the combination of the address signals does not match the combination of the address signals set in the subject address decoder circuit, the voltage of H level is output as the output (ODEC) of the address decoder circuit.

Figure 10:
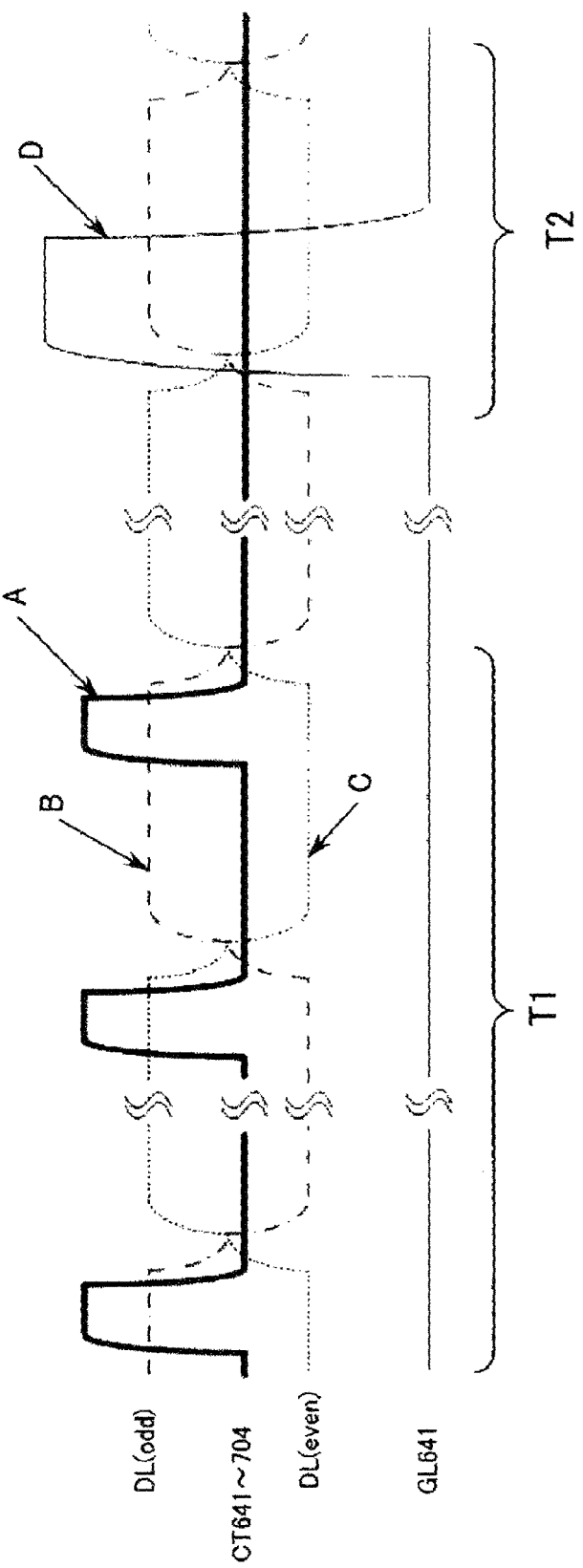
FIG. 10 is a diagram illustrating drive waveforms during touch panel detection and during pixel write in the liquid crystal display device according to the first embodiment of the present invention.

FIG. 10 is a diagram illustrating drive waveforms during touch panel detection and during pixel write in the liquid crystal display device according to the embodiment of the present invention.

Symbol A in FIG. 10 indicates a voltage waveform of the touch panel scanning voltage (Vstc) to be applied to the counter electrode (CT11) of $641^{st}$ to $704^{th}$ display lines in an eleventh block among the counter electrodes divided into 20 blocks. Also, symbol B in FIG. 10 indicates a waveform of a video voltage to be applied to the odd number video lines (DL), and C in FIG. 10 indicates a waveform of the video voltage to be applied to the even number video lines (DL). D in FIG. 10 denotes a date signal to be supplied to the date electrodes of the thin film transistors of the $641^{st}$ display line through the $641^{st}$ scanning line (GL). Further, T1 indicates a touch position detection period, and T2 is a pixel write period.

For the purpose of preventing an influence on display, the touch position detection period (T1) is set to a period other than the pixel write period (T2). Also, in the touch position detection period (T1), in order to increase the detection sensitivity, scanning is conducted by the scanning electrode (TX) at the same portion by plural times, that is, in FIG. 10, the touch panel scanning voltage (Vstc) is applied to the counter electrode (CT11) of the $11^{th}$ block at plural times. Also, within the pixel write period (T2), not the touch panel scanning voltage (Vstc), but the counter voltage (Vcom) is applied to the counter electrode (CT11) of the $11^{th}$ block.

Figure 11:
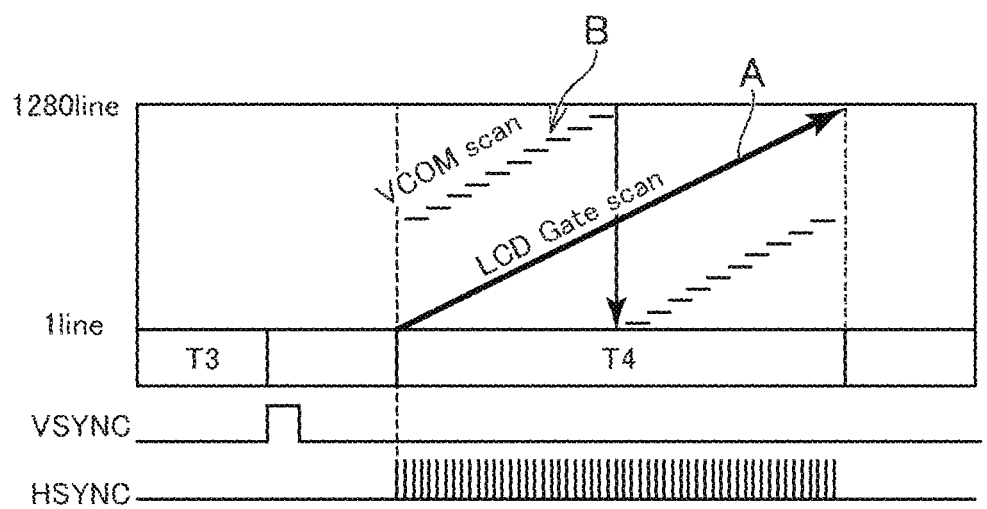
FIG. 11 is a diagram illustrating timings during touch panel detection and during pixel write in the liquid crystal display device according to the first embodiment of the present invention.

FIG. 11 is a diagram illustrating timings during touch panel detection and during pixel write in the liquid crystal display device according to the embodiment of the present invention.

Symbol A in FIG. 11 indicates a pixel write timing from the first display line to the $1280^{th}$ display line in a pixel write period (T4) of one frame, and B in FIG. 11 indicates a touch panel detection timing in the counter electrodes (CT1 to CT20) of the respective blocks divided into 20 blocks.

As illustrated in FIG. 11, the counter electrode of an arbitrary display line functions as the scanning electrodes (TX), and the scanning operation during the touch panel detection is conducted at a portion different from that of gate scanning for conducting pixel write. In FIG. 11, T3 denotes a blanking period, VSYNC is a vertical synchronizing signal, and HSYNC is a horizontal synchronizing signal.

Second Embodiment

Figure 12:
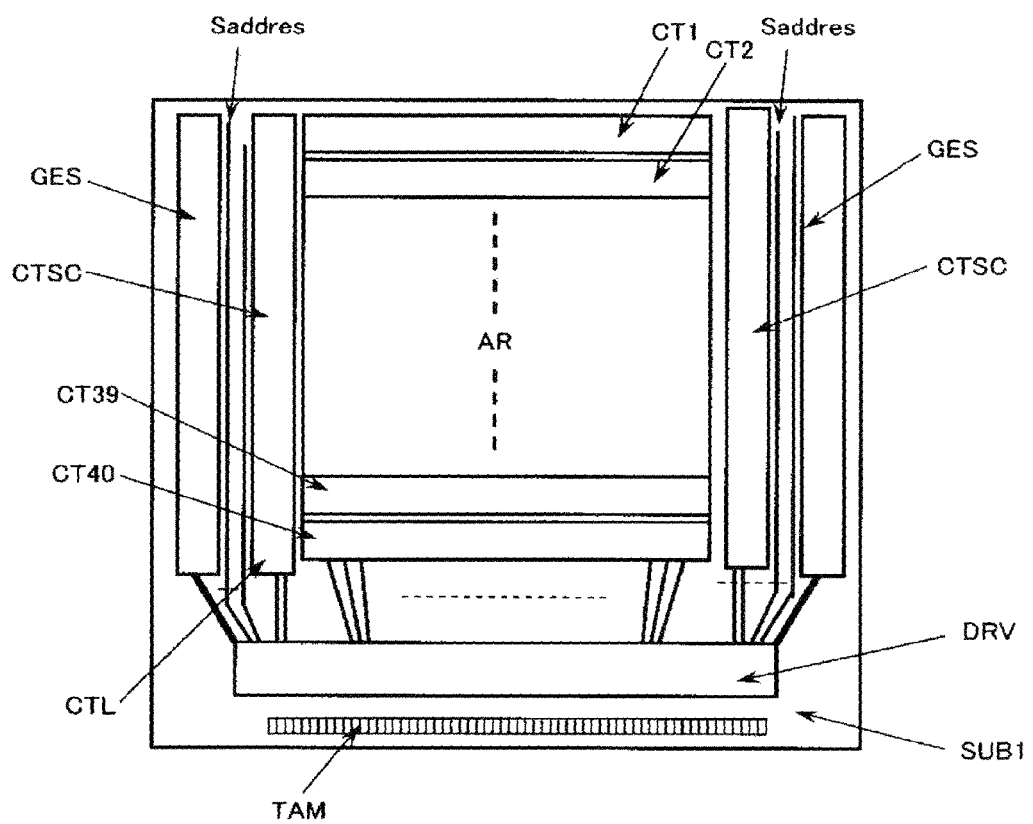
FIG. 12 is a plan view illustrating a method of driving a divided counter electrode in a liquid crystal display device according to a second embodiment of the present invention.

FIG. 12 is a plan view illustrating a method of driving a divided counter electrode in a liquid crystal display device according to a second embodiment of the present invention.

In the touch position detection, in order to enhance the resolution of the detection position, there is a need to thin the electrode width of the scanning electrodes (TX) for scanning. However, as described above, it is desirable that the electrode width of the scanning electrodes (TX) is about 4 mm to 5 mm.

Under the circumstances, in this embodiment, the counter electrodes of two adjacent blocks are driven at a plurality of addresses in an overlap manner with the results that the electrode width of the scanning electrodes (TX) is ensured while enhancing the resolution.

In FIG. 12, in the counter electrodes of the respective blocks, the counter electrode of the 1280 display lines is divided into 40 blocks of CT1 to CT40 with the counter electrode for 32 display lines arranged at 2.5 mm pitches as one block.

During the touch position detection, two blocks such as the counter electrodes of the blocks CT1 and CT2, the counter electrodes of the blocks CT2 and CT3, the counter electrodes of the blocks CT3 and CT4, . . . and the counter electrodes of the blocks CT39 and CT40, are scanned at a time to ensure the electrode width of about 5 mm of the scanning electrodes (TX), and enable the scan width of 2.5 mm. As a result, the resolution in the vertical direction can be improved while holding the detection sensitivity.

Figure 13:
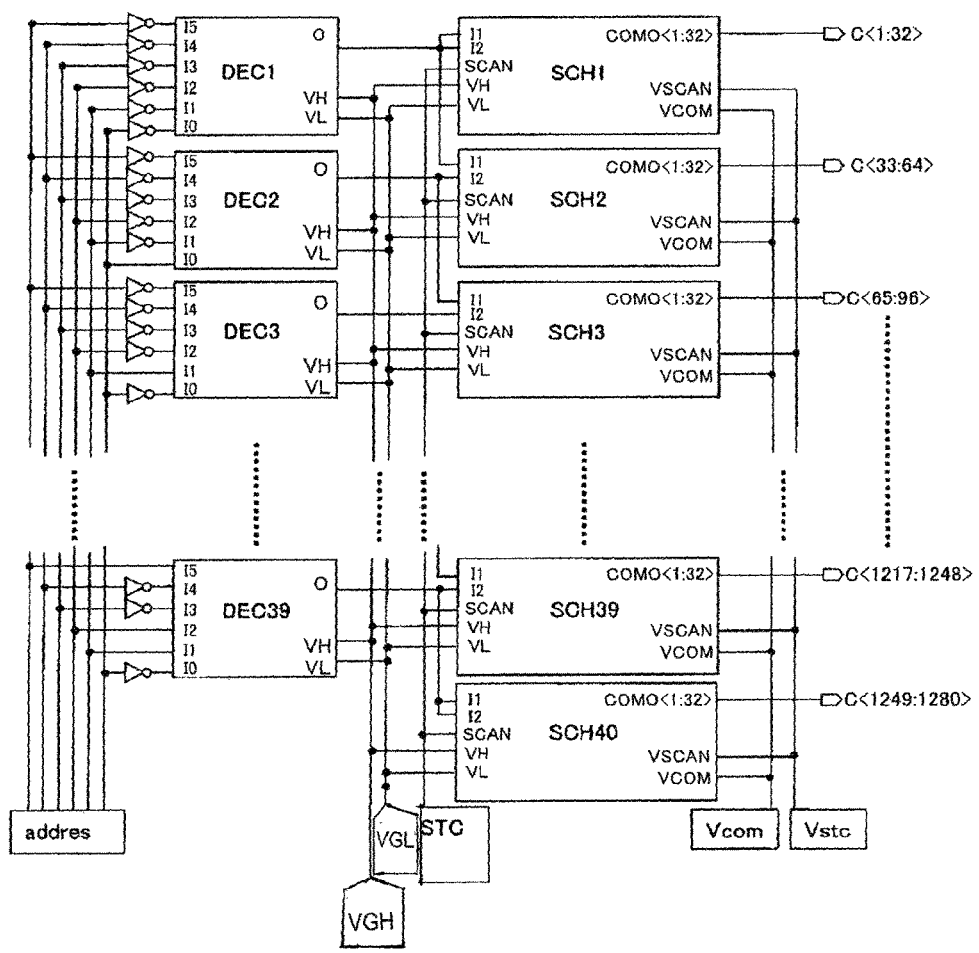
FIG. 13 is a block diagram illustrating a configuration example of a counter electrode selector circuit illustrated in FIG. 12.

FIG. 13 is a block diagram illustrating a configuration example of the counter electrode selector circuit (CTSC) illustrated in FIG. 12. As illustrated in FIG. 13, the counter electrode selector circuit (CTSC) includes address decoder circuits DEC1 to DEC 39, and selector circuits SCH1 to SCH 40.

In this embodiment, the counter electrode (CT) is divided into 40 blocks with the counter electrode for 32 display lines arranged at pitches of 2.5 mm as one block.

For that reason, 39 address decoder circuits (DEC1 to DEC 39) are provided, and the counter electrode of each block is connected to two adjacent address decoder circuits. When any decoder of the two address decoder circuits is selected according to the address signal (addres), the selected counter electrode (CT) for 32 display lines conducts AC driving according to the touch panel scanning signal (STC), and the other counter electrodes (CT) output the counter voltage.

Figure 14:
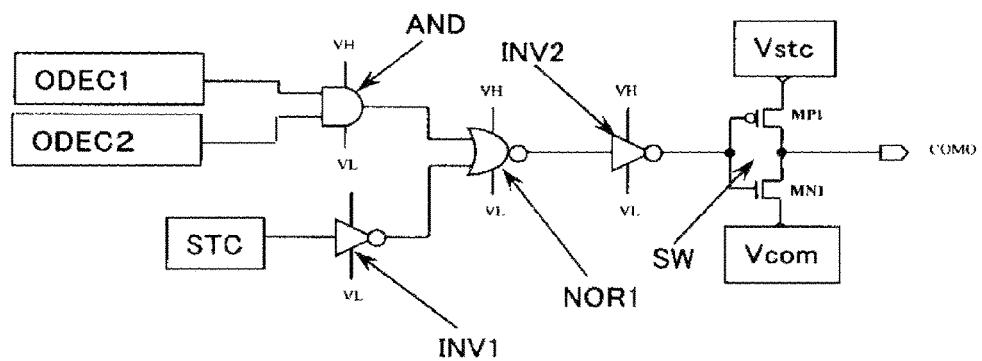
FIG. 14 is a circuit diagram illustrating a circuit configuration of an example of the selector circuit illustrated in FIG. 12.

FIG. 14 is a circuit diagram illustrating a circuit configuration of an example of the selector circuit (SCH1 to SCH40) illustrated in FIG. 13.

The selector circuit illustrated in FIG. 14 is different from the selector circuit illustrated in FIG. 8 in that an AND circuit (AND) that ANDs outputs (ODEC1, ODEC2) of the two adjacent address decoder circuits is added.

In the selector circuit illustrated in FIG. 14, when an output of any one of the two adjacent address decoder circuits becomes L level, an output of the AND circuit (AND) becomes L level. The other operation is identical with that of the selector circuit illustrated in FIG. 8, and therefore a detailed description thereof will be omitted.

Figure 15:
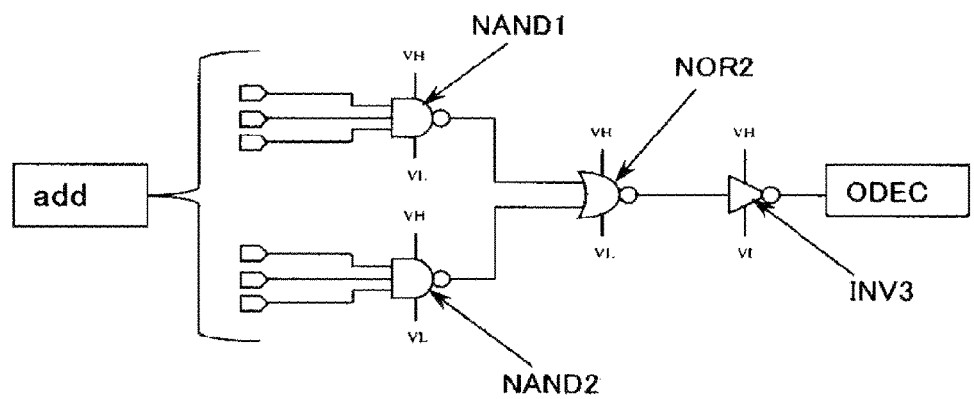
FIG. 15 is a circuit diagram illustrating a circuit configuration of an example of an address decoder circuit illustrated in FIG. 13.

FIG. 15 is a circuit diagram illustrating a circuit configuration of an example of the address decoder circuits (DEC1 to DEC39) illustrated in FIG. 13.

As illustrated in FIG. 13, in this embodiment, since 39 address decoder circuits (DEC1 to DEC 39) are provided, six address signals (addres) are required.

The address decoder circuits (DEC1 to DEC 39) illustrated in FIG. 15) receive the address signals or the inversion signals obtained by inverting the address signals by the inverters (INV) for the sixth address signals (addres), and conduct decoding on the basis of the combination of the six address signals (addres), and the inversion signals of the six address signals (addres).

The circuit configuration of the address decoder circuit illustrated in FIG. 15 is identical with that of the address decoder circuit illustrated in FIG. 9 except that the number of address signals (add) is six, and therefore a detailed description thereof will be omitted.

As has been described above, in the above respective embodiments, the address decode system is applied to a method of selecting the counter electrodes divided into the plurality of blocks. As a result, even when the number of divisions of the counter electrodes is increased, the increased wirings are only the address signal lines (Saddres), and an increase in the width of the right and left frames of the liquid crystal display panel can be suppressed.

When the counter electrodes are changed from 14 divisions described above to 20 divisions, the number of address signal lines (Saddres) is increased from four to five. Because the address signal lines (Saddres) normally operate with a relatively high resistance, only one thin wiring is added at each of the right and left sides, and the number of divisions of the touch panel scanning electrodes can be increased while suppressing an increase in the width of the right and left frames of the liquid crystal display panel.

Also, in the above respective embodiments, a touch panel scanning portion is designated by the address decoder circuit. For that reason, the number and position of touch panel scanning can be changed by merely changing the setting of the liquid crystal driver IC (DRV), to thereby flexibly deal with malfunction caused by noise generated by the display operation or the like.

Hereinafter, a description will be given of a method (QD dynamic operating inspection) of inspecting the counter electrode selector circuit (CTSC) in a liquid crystal display panel dynamic operating inspection (hereinafter referred to as "LCD dynamic operating inspection").

Figure 16:
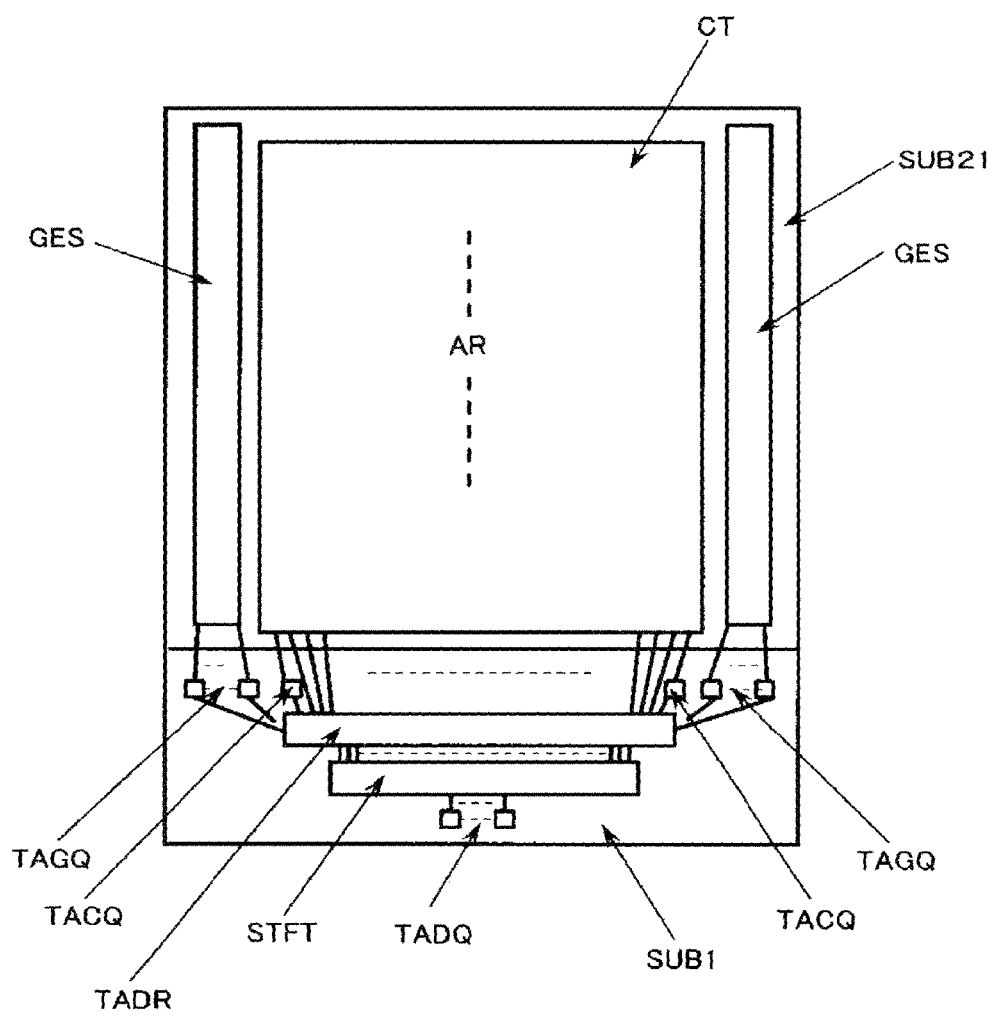
FIG. 16 is a diagram illustrating an outline of an LCD dynamic operating inspection in the liquid crystal display panel into which a scanning line driver circuit is incorporated.

FIG. 16 is a diagram illustrating an outline of the LCD dynamic operating inspection in the liquid crystal display panel into which a scanning line driver circuit is incorporated.

In the LCD dynamic operating inspection, there is used a liquid crystal display panel in which the first substrate (SUB 1) and the second substrate (SUB 2) have been bonded together, and liquid crystal has been sealed therebetween before the liquid crystal driver IC (DRV) is mounted thereon.

As illustrated in FIG. 16, QD test connection terminals (TAGQ) for the scanning line driver circuits, QD test connection terminals (TACQ) for the counter electrodes, and QD test connection terminals (TADQ) for the video lines are formed in an area of the first substrate (SUB 1) which does not face the second substrate (SUB 2). In FIG. 16, TADR is a driver IC connection terminal connected to the respective terminals of the liquid crystal driver is (DRV), and STFT is a thin film transistor for dynamic operating inspection.

A control signal of the scanning line driver circuits, and drive signals such as the signal for the video lines, and the signal for the counter electrode are input to the respective terminals TAGQ, TACQ, and TADQ, whereby the liquid crystal display panel can be lighted before the liquid crystal driver IC (DRV) is mounted thereon. As a result, the disconnection of wiring, the malfunction of the scanning line driver circuit, and the characteristic failure of the thin film transistor (TFT) can be determined according to the display image.

The control signal of the scanning line driver circuits and the signals for the counter electrodes are input to terminals formed between the scanning line driver circuits (GES) incorporated into the pixel or the liquid crystal display panel, and the connection terminals (or the terminal of the flexible wiring substrate) of the liquid crystal driver IC (DRV) to supply a signal that simulates the drive signal output by the liquid crystal driver IC (DRV).

Figure 17:
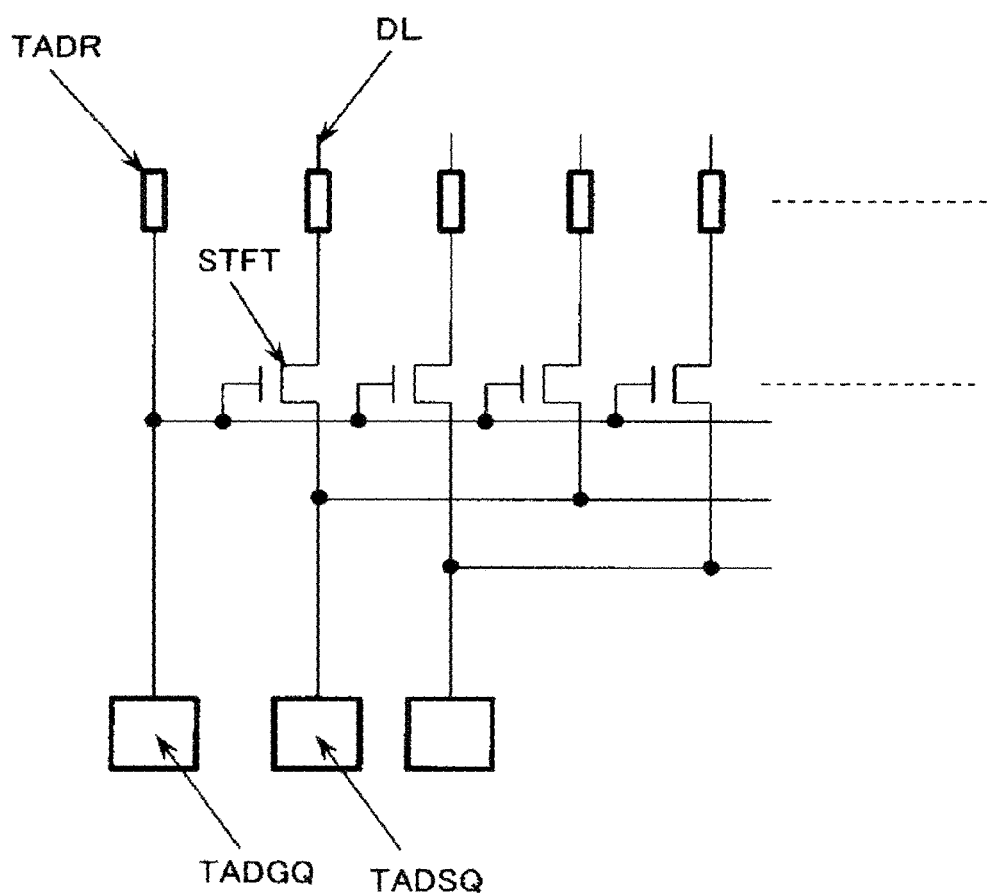
FIG. 17 is a diagram illustrating a dynamic operating inspection thin film transistor illustrated in FIG. 16.

For input of the video line signals, because the number of terminals is enormous, the thin film transistors for dynamic operating inspection (STFT) are used. FIG. 17 illustrates an example of the thin film transistors for dynamic operating inspection (STFT).

As illustrated in FIG. 17, drain electrodes (or source electrodes) of the thin film transistor for dynamic operating inspection (SIFT) are connected to the respective driver IC connection terminals (TADR), and collected to a plurality of common lines. FIG. 17 illustrates a case in which two systems of the common lines are provided, and different signals can be supplied to odd and even number video lines (DL) from two QD test connection terminals (TADSQ) for the drains (or sources) of the thin film transistors for dynamic operating inspection (STFT). With this configuration, multicolor display, adjacent source line short-circuit inspection and the like are enabled to conduct early detection and handling of a defect, and the quality assurance of a post-process.

In the LCD dynamic operating inspection, a voltage for turning on the thin film transistors for dynamic operating inspection (STFT) is applied to the gate electrodes of the thin film transistors for dynamic operating inspection (STFT) from a QD test connection terminal (TADGQ) for the gates of the thin film transistors for dynamic operating inspection (STFT).

Also, when the liquid crystal driver IC (DRV) is mounted, the QD test connection terminal (TADGQ) for the gates of the thin film transistors for dynamic operating inspection (STFT) is connected to the driver IC connection terminal (TDR) that outputs a voltage for turning off the thin film transistors for dynamic operating inspection (STFT). For that reason, there is no need to mechanically disconnect the common lines.

Figure 18:
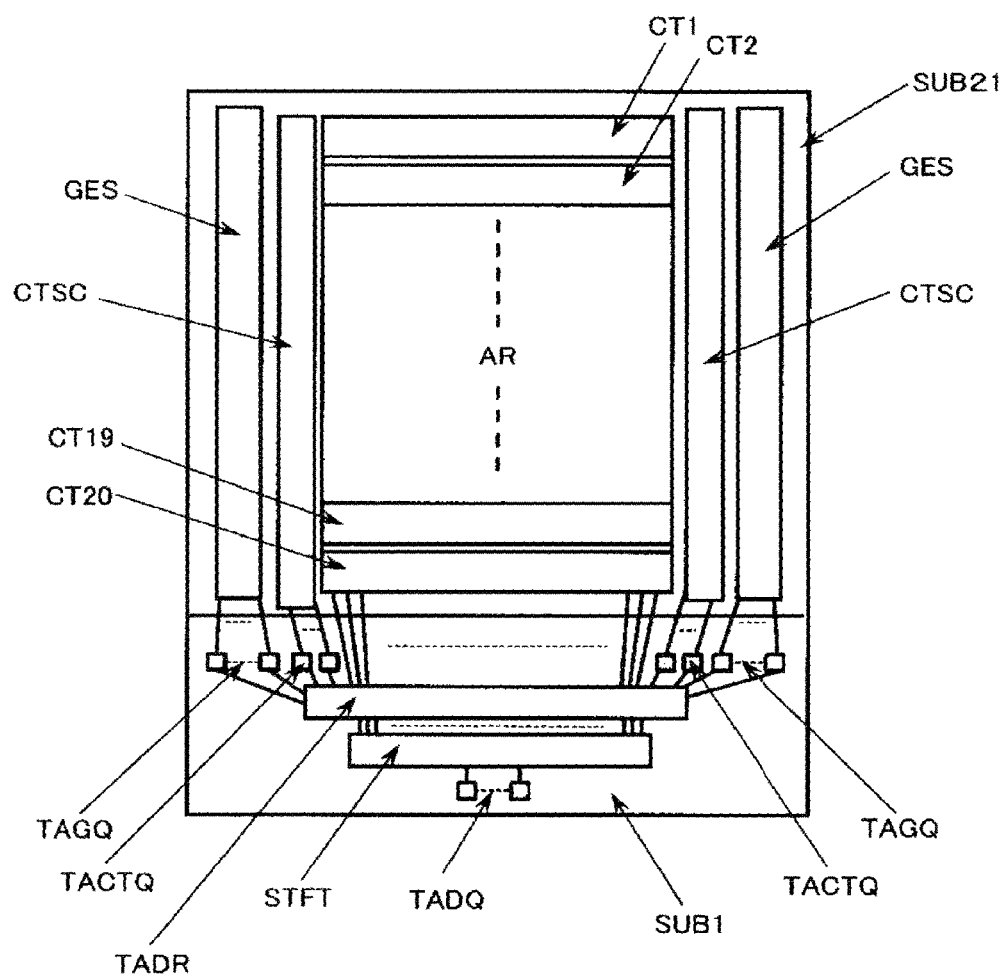
FIG. 18 is a diagram illustrating an outline of the LCD dynamic operating inspection in the liquid crystal display device according to the first embodiment of the present invention.

QD Dynamic Operating Inspection According to the Respective Embodiments of the Invention FIG. 18 is a diagram illustrating an outline of the LCD dynamic operating inspection in the liquid crystal display device according to the first embodiment of the present invention. FIG. 18 is an outline diagram illustrating the LCD dynamic operating inspection when there is provided the counter electrode selector circuit (CTSC).

A difference from FIG. 16 resides in that the QD test connection terminals (TACQ) for the counter electrodes is replaced with QD test connection terminals (TACTQ) for driving the counter electrode selector circuit.

Figure 19:
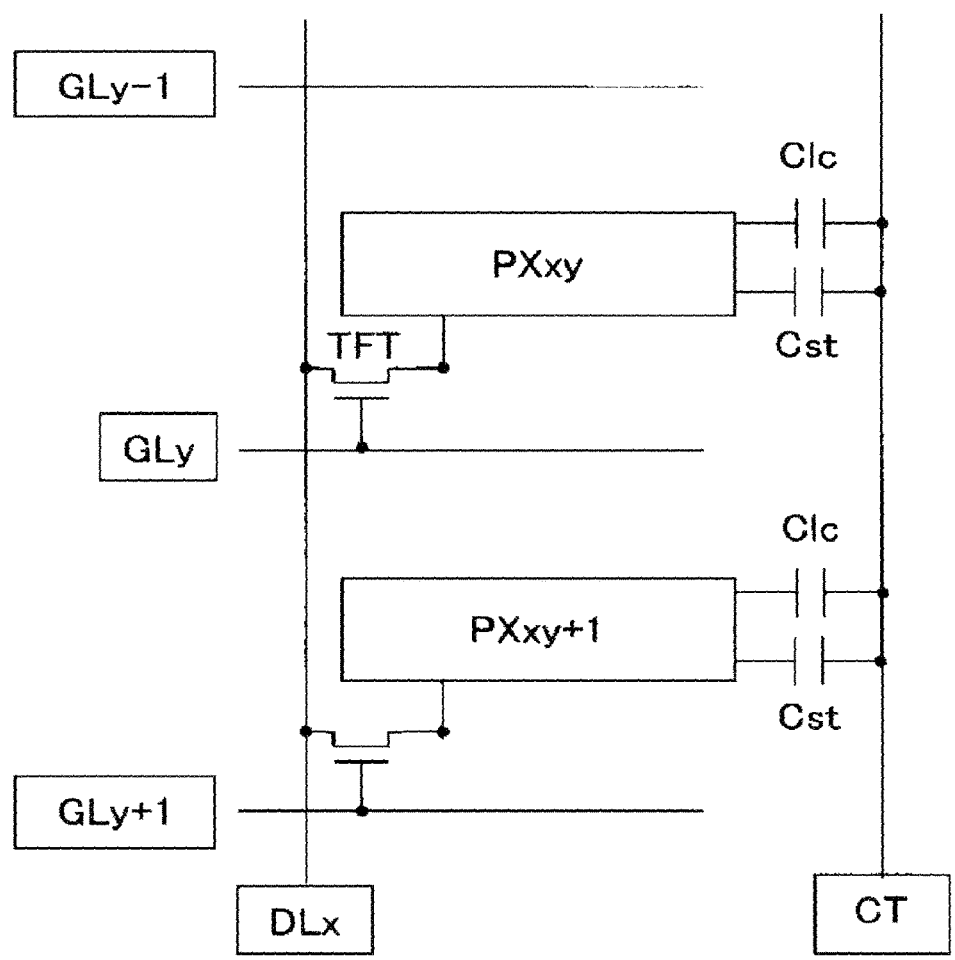
FIG. 19 is a circuit diagram illustrating an equivalent circuit of a pixel in the respective embodiments of the present invention.

FIG. 19 is a circuit diagram illustrating an equivalent circuit of a pixel in the respective embodiments of the present invention.

Referring to FIG. 19, DLx is a video line on an x-row, GLy is a scanning line on a y-row, PXxy is a pixel electrode on (x, y), CT is an counter electrode, Cst is a retentive capacitance, and Clc is a liquid crystal capacitance.

In the normal liquid crystal driving, thin film transistors (TFT) of the respective pixels are sequentially operated for each display line according to scanning signals to be input to the gate electrodes of the thin film transistors (TFT). The retentive capacitance (Cst) and the liquid crystal capacitance (Clc) connected between each pixel electrode (PX) and each counter electrode (CT) are charged with a video voltage and retained to apply the voltage to the liquid crystal for lighting and displaying.

It is also desirable to detect a defect in the counter electrode selector circuit (CTSC) for the touch panel by dynamic operating inspection. However, in scanning for position detection of the touch panel, because driving is conducted without affecting the display of the liquid crystal display panel, there is a need to use a specific driving method for only inspection in order to apply the counter electrode selector circuit (CTSC) to an LCD dynamic operating inspection process.

Figure 20:
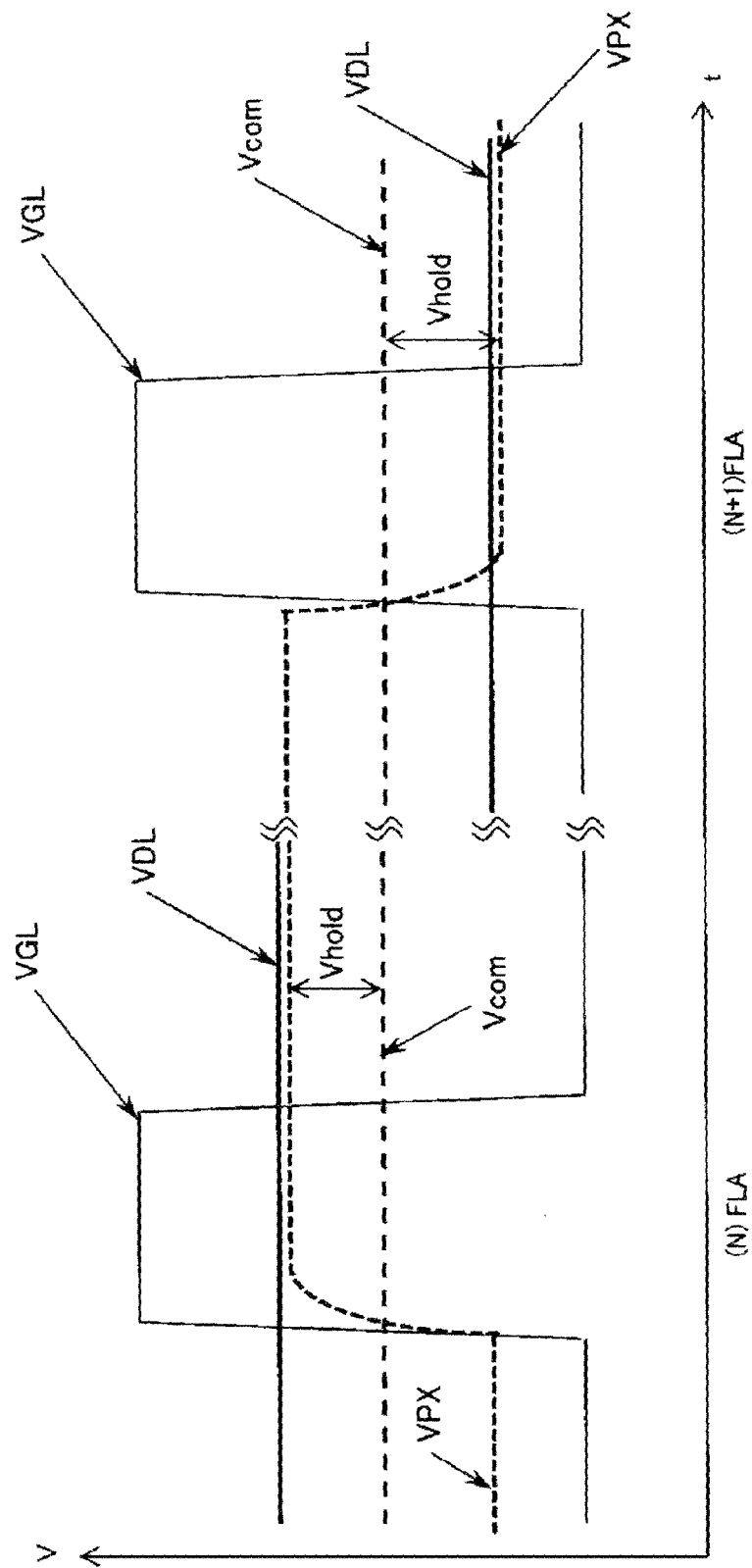
FIG. 20 is a diagram illustrating a voltage waveform of a normal liquid crystal drive signal in a general liquid crystal display device.

FIG. 20 is a diagram illustrating a voltage waveform of a normal liquid crystal drive signal in the general liquid crystal display device.

FIG. 20 illustrates only a case in which the counter voltage to be applied to the counter electrode (CT) is DC driving, as an example. Also, in FIG. 20, Vcom is a counter voltage to be applied to the counter electrode (CT), VDL is a video voltage to be applied to the video lines (DL), VPX is a voltage across the pixel electrode (PX), VGL is a scanning voltage to be applied to the scanning lines (GL), and Vhold is a retention voltage to be held by each pixel.

In the normal liquid crystal driving, in a state where the counter voltage (Vcom) of a fixed potential is input to the counter electrode (CT), a scanning voltage (VGL) is input to the gate electrode of the thin film transistors (TFT), and a video voltage (VDL) for applying a desired voltage (VPX) is input to the pixel electrode of the respective pixels. For the purpose of preventing the deterioration of liquid crystal, the video voltage (VDL) switches positive and negative polarities of the potential to the counter voltage (Vcom) on a frame basis to conduct AC driving.

Figure 21:
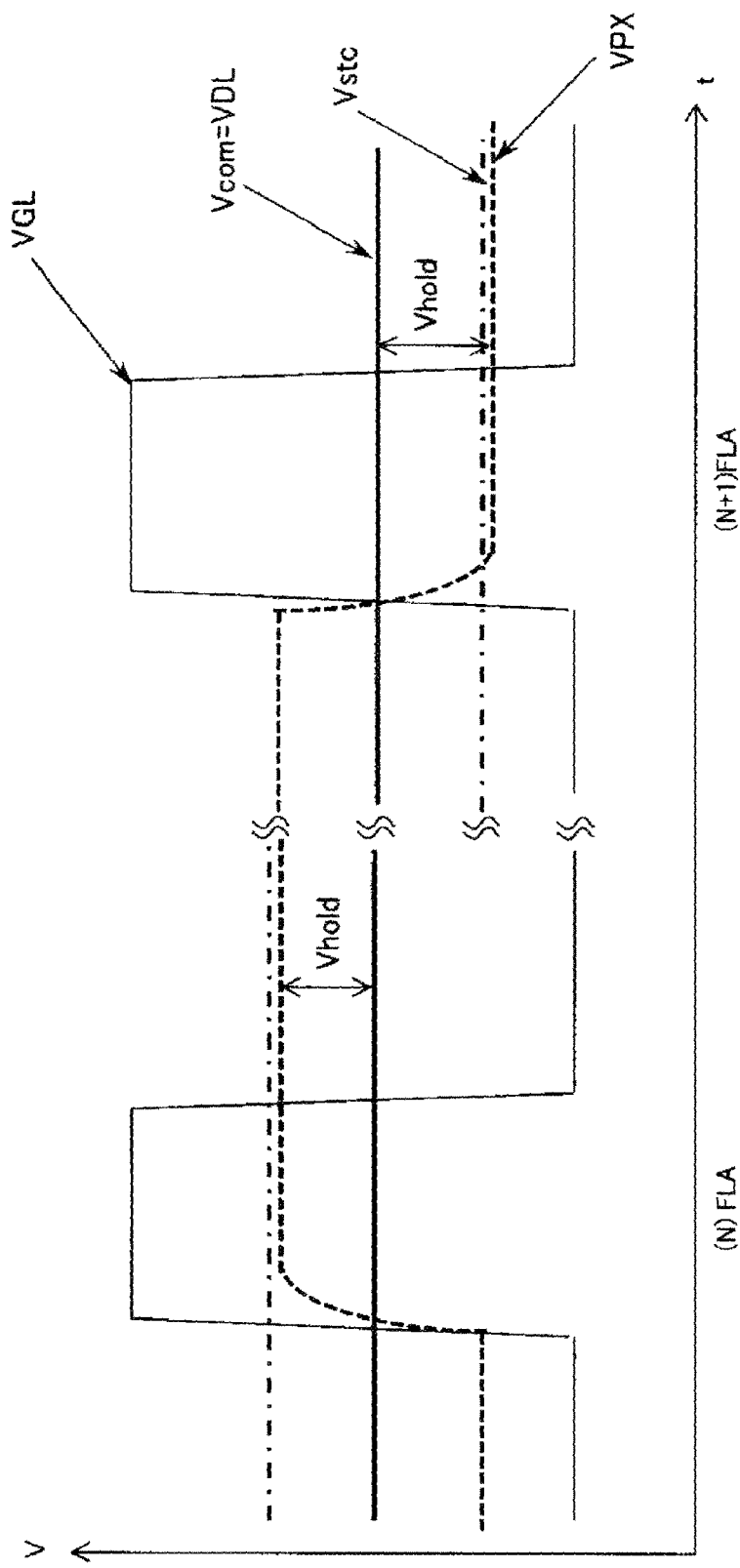
FIG. 21 is a diagram illustrating a drive waveform for a counter electrode selector circuit inspection in the liquid crystal display device according to the respective embodiments of the present invention.

FIG. 21 is a diagram illustrating a drive waveform for a counter electrode selector circuit inspection in the liquid crystal display device according to the respective embodiments of the present invention.

As illustrated in FIG. 21, the video voltage (VDL) and the counter voltage (Vcom) are fixed at the same voltage, and the touch panel scanning voltage (Vstc) is an AC signal.

With the above configuration, at timing of the write operation, the counter electrode selector circuit (CTSC) is selected. At a portion where the touch panel scanning voltage (Vstc) is output, AC operation is conducted for the counter voltage (Vcom). As a result, a voltage difference occurs between the pixel electrode (PX) and the counter electrode (CT), and the retention voltage (Vhold) is held at each pixel.

On the other hand, when the counter electrode selector circuit (CTSC) does not normally operate at the timing of the write operation, no voltage difference is developed between the pixel electrode (PX) and the counter electrode (CT). That is, a portion where the counter electrode selector circuit (CTSC) normally operates is lighted, and a defective portion is not lighted. Therefore, the operation of the counter electrode selector circuit (CTSC) can be inspected.

Figure 22:
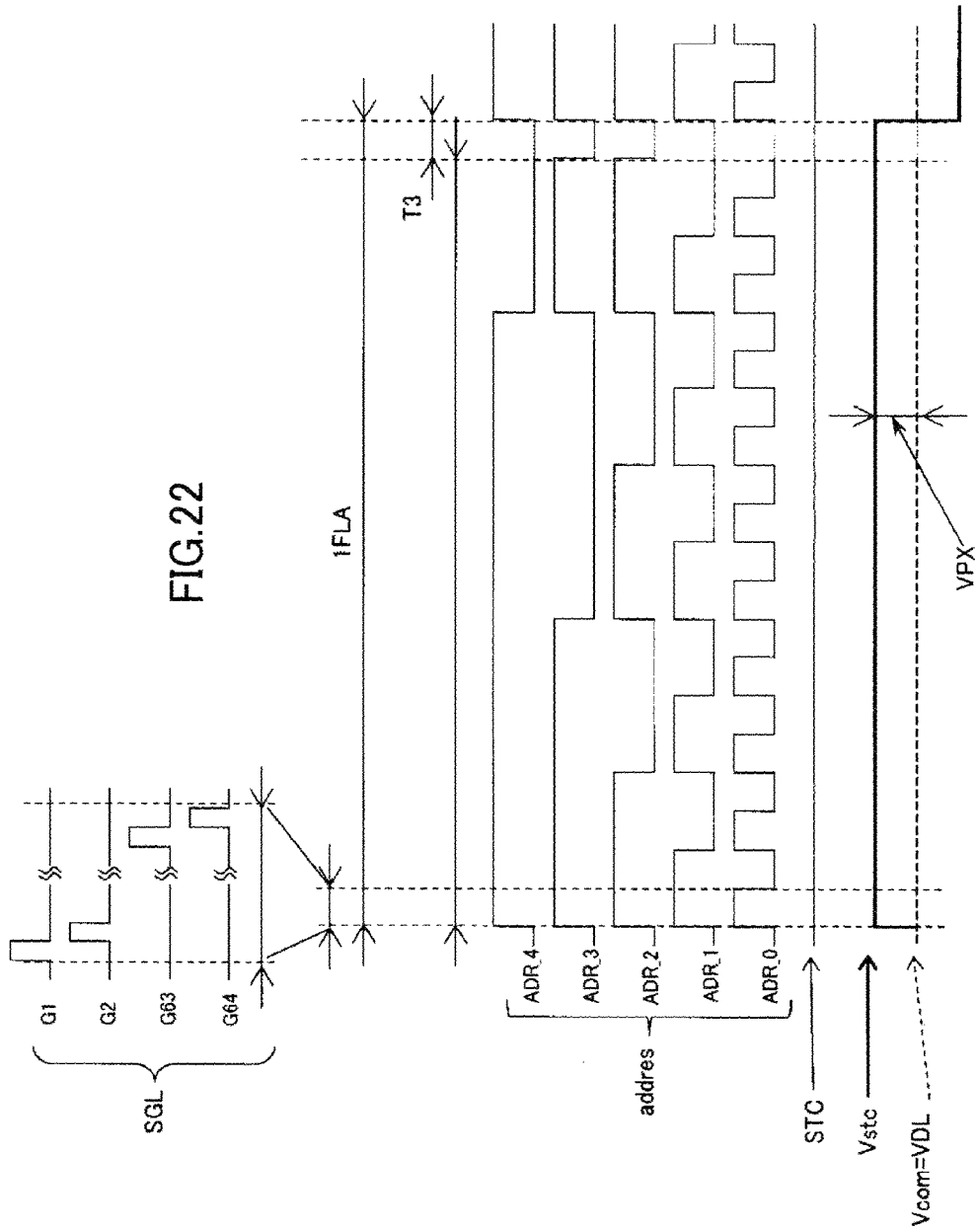
FIG. 22 is a diagram illustrating an example of a signal waveform of the counter electrode selector circuit for the purpose of inspecting the address decoder circuit according to the respective embodiments of the present invention.

FIG. 22 is a diagram illustrating an example of a signal waveform of the counter electrode selector circuit (CTSC) for the purpose of inspecting the address decoder circuit according to the respective embodiments of the present invention.

FIG. 22 illustrates a case in which the resolution is HD (720 RGB×1280 pixels), and one block is the counter electrode of 64 display lines.

The touch panel scanning signal (STC) is fixed to a voltage of H level, and the address signals (addres) of ADR_0 to ADR_4 are input so that the counter electrodes (CT) of the respective blocks are sequentially selected by the address decoder circuits (DEC1 to DEC 20), in synchronism with the timing at which a select scanning voltage (SDL) is sequentially applied to the scanning lines (GL) of, for example, GL1 to GL64. With this configuration, the touch panel scanning voltage (Vstc) is applied to the respective pixels at the respective display lines of 1 to 64.

When all of the address decoder circuits (DEC1 to DEC 20) normally operate, because a voltage (VPX in FIG. 22) based on the touch panel scanning voltage (Vstc) is applied to the liquid crystal in all of the pixels, the entire screen is lighted and displayed. When a specific circuit malfunctions, because the touch panel scanning voltage (Vstc) is not output from an appropriate counter line, a transverse band non-lighting (black display) occurs with the result that the failure can be detected.

Figure 23:
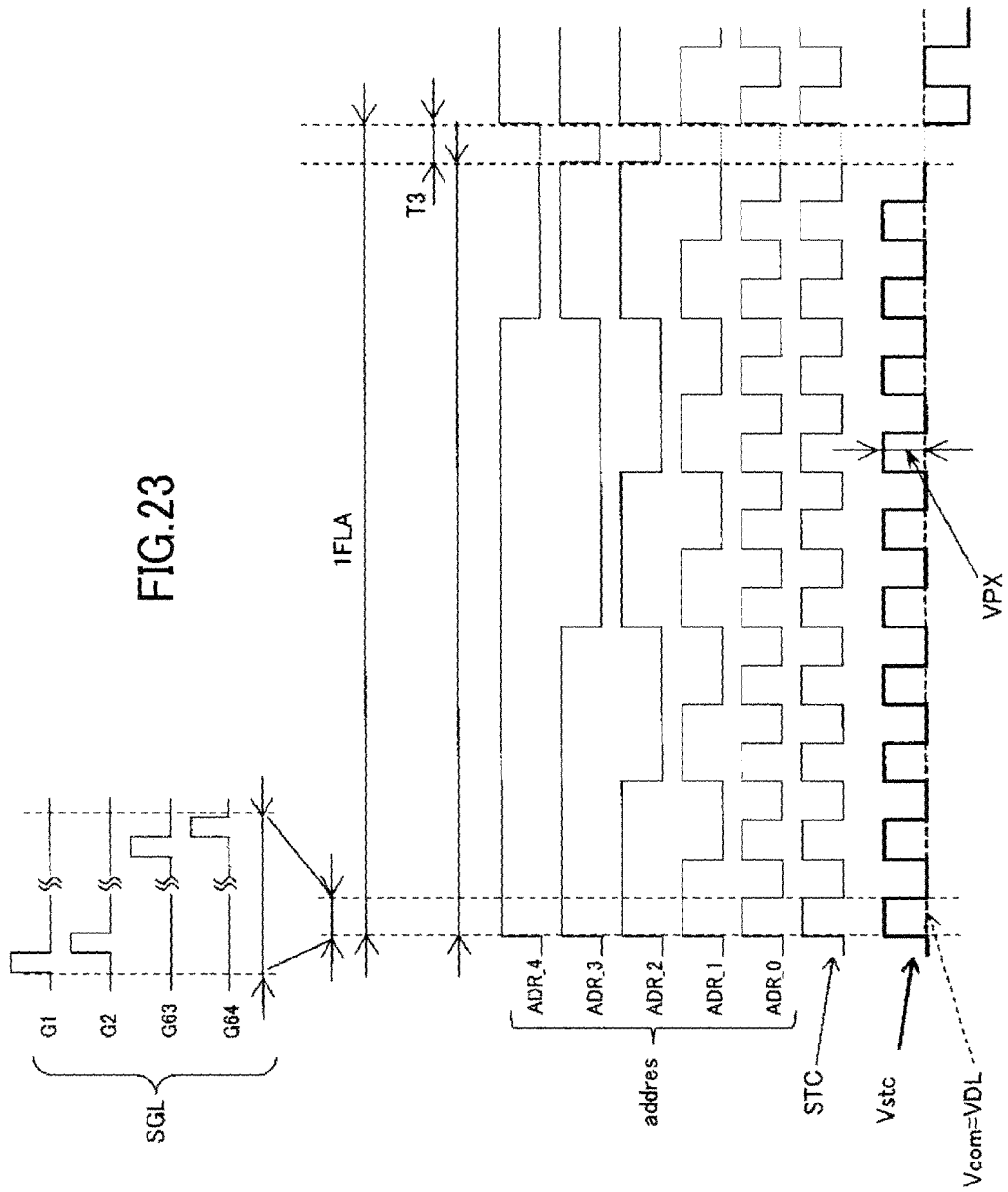
FIG. 23 is a diagram illustrating an example of a signal waveform of the counter electrode selector circuit for the purpose of inspecting the selector circuit according to the respective embodiments of the present invention.

FIG. 23 is a diagram illustrating an example of a signal waveform of the counter electrode selector circuit (CTSC) for the purpose of inspecting the selector circuit according to the respective embodiments of the present invention.

A difference from FIG. 22 resides in that the touch panel scanning signal (STC) switches between H level and L level every 64 display lines. As a result, the voltage across the selector circuits (SCH1 to SCH 20) is switched according to the touch panel scanning signal (STC).

In FIG. 23, because the touch panel scanning voltage (Vstc) is output by the counter electrodes of the odd number blocks, transverse stripes of white and black are displayed along a gate scan direction. When a specific lighting output circuit malfunctions by inversion of the touch panel scanning signal (STC), the failure can be detected as a transverse black line by the dynamic operating inspection for each of even number columns/odd number columns of the counter electrodes of the respective blocks.

Also, this inspection method can detect the circuit failure attributable to disconnection or short-circuit, and also can inspect the deterioration of the image quality caused by a counter signal output delay by changing a drive frequency or a drive method (frame/line inversion, etc.) of the liquid crystal display panel. For that reason, the operation margin of the counter electrode selector circuit (CTSC) can be inspected.

The invention made by the present inventors has been described above specifically on the basis of the embodiments. However, the present invention is not limited to the above embodiments, but can be variously changed without departing from the scope and spirit of the present invention.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
   a first substrate;
   a second substrate;
   a plurality of pixel electrodes provided on the first substrate;
   a common electrode facing to the plurality of pixel electrodes commonly and divided into a plurality of blocks;

an output circuit provided on the first substrate and selecting a block of the plurality of blocks during a touch detecting period;
a pulse signal line supplying a touch detecting pulse to the output circuit; and
a common voltage line supplying a common voltage to the output circuit,
wherein the output circuit electrically connects between the pulse signal line and selected block which is selected during the touch detecting period,
wherein the output circuit electrically connects between the common voltage line and other blocks of the plurality of blocks which are not selected by the output circuit,
wherein the plurality of pixel electrodes are electrically connected to a plurality of switching elements respectively,
wherein the first substrate has a plurality of scanning signal lines which supply a control signal to the plurality of switching elements,
wherein the first substrate has a scanning line driver circuit that applies the control signal to the plurality of scanning signal lines,
wherein the plurality of pixel electrodes arranged in a matrix configure a display area, and
wherein the pulse signal line is arranged between the scanning line driver circuit and the display area.

2. The display device according to claim 1,
wherein the output circuit electrically connects between the pulse signal line and two adjacent blocks of the plurality of blocks at a same time.

3. The display device according to claim 1,
wherein the first substrate has a plurality of display lines which supplies a display signal to the plurality of pixel electrodes, and
wherein each block of the common electrode is commonly provided for the plurality of pixel electrodes of one display line respectively.

4. The display device according to claim 1,
wherein the output circuit includes:
an address decoder circuit that selects at least one block of the plurality of blocks respectively for a given period; and
the output circuit applies the touch detecting pulse to the at least one block of the plurality of blocks selected by the address decoder circuit, and applies the common voltage to other blocks of the plurality of blocks not selected by the address decoder circuit.

5. The display device according to claim 1,
wherein the output circuit is arranged between the scanning line driver circuit and the display area.

6. The display device according to claim 5,
wherein the pulse signal line is provided between the scanning line driver circuit and the output circuit.

7. A display device comprising:
a first substrate;
a second substrate;
a plurality of pixel electrodes provided on the first substrate;
a common electrode facing to the plurality of pixel electrodes commonly and divided into a plurality of blocks;
an output circuit provided on the first substrate and selecting a block of the plurality of blocks during a touch detecting period;
a detecting signal line supplying a touch detecting pulse to the output circuit; and
a common voltage line supplying a common voltage to the output circuit,
wherein the output circuit electrically connects between the detecting signal line and selected block which is selected during the touch detecting period,
wherein the output circuit electrically connects between the common voltage line and other blocks of the plurality of blocks which are not selected by the output circuit,
wherein the plurality of pixel electrodes are electrically connected to a plurality of switching elements respectively,
wherein the first substrate has a plurality of scanning signal lines which supply a control signal to the plurality of switching elements,
wherein the first substrate has a scanning line driver circuit that applies the control signal to the plurality of scanning signal lines,
wherein the plurality of pixel electrodes arranged in a matrix configure a display area, and
wherein the detecting signal line and the common voltage line are arranged between the scanning line driver circuit and the display area.

8. The display device according to claim 7,
wherein the output circuit electrically connects between the detecting signal line and two adjacent blocks of the plurality of blocks at a same time.

9. The display device according to claim 7,
wherein the first substrate has a plurality of display lines which supplies a display signal to the plurality of pixel electrodes, and
wherein each block of the common electrode is commonly provided for the plurality of pixel electrodes of one display line respectively.

10. The display device according to claim 7,
wherein the output circuit includes:
an address decoder circuit that selects at least one block of the plurality of blocks respectively for a given period; and
the output circuit applies the touch detecting pulse to the at least one block of the plurality of blocks selected by the address decoder circuit, and applies the common voltage to other blocks of the plurality of blocks not selected by the address decoder circuit.

11. The display device according to claim 7,
wherein the output circuit is arranged between the scanning line driver circuit and the display area.

12. The display device according to claim 7,
wherein the detecting signal line is provided between the scanning line driver circuit and the output circuit.

* * * * *